(12) United States Patent
Shimizu et al.

(10) Patent No.: US 11,494,383 B2
(45) Date of Patent: Nov. 8, 2022

(54) DATABASE MANAGEMENT SYSTEM AND DATABASE MANAGEMENT METHOD

(71) Applicants: Hitachi, Ltd., Tokyo (JP); The University of Tokyo, Tokyo (JP)

(72) Inventors: Akira Shimizu, Tokyo (JP); Kouji Kimura, Tokyo (JP); Kazuhiko Mogi, Tokyo (JP); Masaru Kitsuregawa, Tokyo (JP); Kazuo Goda, Tokyo (JP); Yuto Hayamizu, Tokyo (JP)

(73) Assignees: HITACHI, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 114 days.

(21) Appl. No.: 16/576,947

(22) Filed: Sep. 20, 2019

(65) Prior Publication Data
US 2020/0265050 A1 Aug. 20, 2020

(30) Foreign Application Priority Data
Feb. 15, 2019 (JP) .............................. JP2019-025453

(51) Int. Cl.
*G06F 16/2455* (2019.01)
*G06F 16/28* (2019.01)
*G06F 16/2453* (2019.01)

(52) U.S. Cl.
CPC .. *G06F 16/24553* (2019.01); *G06F 16/24542* (2019.01); *G06F 16/24549* (2019.01); *G06F 16/289* (2019.01)

(58) Field of Classification Search
CPC ............. G06F 16/217; G06F 16/24542; G06F 16/24544; G06F 16/24549; G06F 16/24553; G06F 16/24561; G06F 16/289; G06F 2201/81; G06F 11/3062
See application file for complete search history.

(56) References Cited

U.S. PATENT DOCUMENTS

| | | | | |
|---|---|---|---|---|
| 6,092,062 | A | * | 7/2000 | Lohman ............ G06F 16/24542 |
| 7,640,409 | B1 | * | 12/2009 | Stafford ................ G06F 3/0647 711/162 |
| 2005/0071384 | A1 | * | 3/2005 | Cotner ................ G06F 11/1471 |

(Continued)

FOREIGN PATENT DOCUMENTS

JP 2018055394 A * 4/2018

OTHER PUBLICATIONS

Badrish Chandramouli et al., "Query Suspend and Resume", SIGMOD'07, Jun. 12-14, 2007, Beijing, China.

(Continued)

*Primary Examiner* — James E Richardson
(74) *Attorney, Agent, or Firm* — Mattingly & Malur, PC

(57) ABSTRACT

When a DBMS receives a suspend instruction in which a suspend completion time of query processing is a future time and between receipt of the suspend instruction and the suspend completion time, if there is a target object (at least a processing object whose execution is in progress upon receipt of the suspend instruction) whose predicted completion time is at or precedes the suspend completion time, the DBMS changes the state of the target object to a state signifying a snapshot suspend. If there is a processing object whose state signifies a snapshot suspend, the DBMS executes the processing object at or before the suspend completion time.

11 Claims, 19 Drawing Sheets

(56) References Cited

U.S. PATENT DOCUMENTS

| | | | |
|---|---|---|---|
| 2009/0254916 A1* | 10/2009 | Bose | G06F 9/5066 |
| | | | 718/104 |
| 2010/0235349 A1* | 9/2010 | Kuno | G06F 16/217 |
| | | | 707/718 |
| 2012/0054175 A1* | 3/2012 | Barsness | G06F 16/2455 |
| | | | 707/719 |
| 2012/0054514 A1* | 3/2012 | Barsness | G06F 16/903 |
| | | | 713/320 |
| 2012/0109936 A1* | 5/2012 | Zhang | G06F 11/3447 |
| | | | 707/713 |
| 2014/0214793 A1* | 7/2014 | Tatemura | G06F 16/2453 |
| | | | 707/713 |

OTHER PUBLICATIONS

Surajit Chaudhuri, et al., "Stop-and-Restart Style Execution for Long Running Decision Support Queries", VLDB '07, Sep. 23-28, 2007, Vienna, Austria.

* cited by examiner

```
SELECT   O.CUSTKEY, sum(L.EXTENDEDPRICE)
FROM     ORDERS O, LINEITEM L
WHERE    O.ORDERKEY = L.ORDERKEY
     AND L.SHIPDATE >= date '1994-01-01'
     AND L.SHIPDATE <  date '1994-01-01' + 1 year
GROUP BY O.CUSTKEY;
```

FIG. 7

Object list information
190

| Object ID | Time period cost | Block ID | Target data |
|---|---|---|---|
| A-1 | 30 | A | LINEITEM table, Segments #1~#10 |
| A-2 | 30 | A | LINEITEM table, Segments #11~#20 |
| ... | ... | ... | ... |
| A-35 | 30 | A | LINEITEM table, Segments #341~#350 |
| B-1 | 40 | B | ORDERS table, Segments #1~#10 |
| B-2 | 40 | B | ORDERS table, Segments #11~#20 |
| B-3 | 40 | B | ORDERS table, Segments #21~#30 |
| B-4 | 40 | B | ORDERS table, Segments #31~#40 |
| B-5 | 40 | B | ORDERS table, Segments #41~#50 |
| B-6 | 40 | B | ORDERS table, Segments #51~#60 |
| ... | ... | ... | ... |
| B-11 | 20 | B | ORDERS table, Segments #101~#105 |
| C | 10 | C | Intermediate results generated by block B |
| TxID: 201812071800 | | | |

FIG. 8

Transaction management information
191

| TxID | Request type | Suspend flag | Suspend completion time |
|---|---|---|---|
| 201812071800 | FETCH | ON | 23:30 |

State management information
192

| Object ID | State | Start time | End time |
|---|---|---|---|
| A-1 | Execution complete | 18:00 | 18:32 |
| A-2 | Execution complete | 18:00 | 18:28 |
| ... | ... | ... | ... |
| A-35 | Execution complete | 21:52 | 22:31 |
| B-1 | Execution in progress | 22:32 | |
| B-2 | Execution in progress | 22:32 | |
| B-3 | Execution complete | 22:32 | 22:57 |
| B-4 | Execution in progress | 22:32 | |
| B-5 | Execution in progress | 22:57 | |
| B-6 | Executable | | |
| ... | ... | ... | ... |
| B-11 | Executable | | |
| C | Unexecutable | | |
| TxID: 201812071800 | | | |

State management information
192

| Object ID | State | Start time | End time |
|---|---|---|---|
| A-1 | Execution complete | 18:00 | 18:32 |
| A-2 | Execution complete | 18:00 | 18:28 |
| ... | ... | ... | ... |
| A-35 | Execution complete | 21:52 | 22:31 |
| B-1 | Suspend(SS) | 22:32 | |
| B-2 | Suspend(SS) | 22:32 | |
| B-3 | Execution complete | 22:32 | 22:57 |
| B-4 | Suspend(SS) | 22:32 | |
| B-5 | Suspend(DP) | 22:57 | |
| B-6 | Executable | | |
| ... | ... | ... | ... |
| B-11 | Executable | | |
| C | Unexecutable | | |
| TxID | | | |

901

Transaction management information 1700

| TxID /801 | Request type /802 | Suspend flag /803 | Suspend completion time /804 | Power consumption upper limit /1701 |
|---|---|---|---|---|
| 201812071800 | FETCH | ON | 24:00 | 400 W |

FIG. 19

Object list information
190

| Object ID | Time period cost | Power cost | Block ID | Volume ID | Target data |
|---|---|---|---|---|---|
| A-1 | 30 | 200 W | A | 1801A | LINEITEM table, segments #1~#10 |
| A-2 | 30 | 200 W | A | 1801B | LINEITEM table, segments #11~#20 |
| ... | ... | ... | ... | ... | ... |
| A-35 | 30 | 200 W | A | 1801A | LINEITEM table, segments #341~#350 |
| B-1 | 40 | 250 W | B | 1801C, 1801E | ORDERS table, segments #1~#10 |
| B-2 | 40 | 250 W | B | 1801D, 1801E | ORDERS table, segments #11~#20 |
| B-3 | 40 | 250 W | B | 1801C, 1801E | ORDERS table, segments #21~#30 |
| B-4 | 40 | 250 W | B | 1801D, 1801E | ORDERS table, segments #31~#40 |
| B-5 | 40 | 250 W | B | 1801C, 1801E | ORDERS table, segments #41~#50 |
| B-6 | 40 | 250 W | B | 1801D, 1801E | ORDERS table, segments #51~#60 |
| ... | ... | ... | ... | ... | ... |
| B-11 | 20 | 250 W | B | 1801C, 1801E | ORDERS table, segments #101~#105 |
| C | 10 | 100 W | C | 1801E | Intermediate results generated by block B |

TxID: 201812071800

FIG. 20

State management information
2000

| Object ID | State | Start time | End time |
|---|---|---|---|
| A-1 | Execution complete | 18:00 | 18:32 |
| A-2 | Execution complete | 18:00 | 18:28 |
| ... | ... | ... | ... |
| A-35 | Execution complete | 21:52 | 22:31 |
| B-1 | Suspend(wait) | | |
| B-2 | Suspend(SS) | 22:32 | |
| B-3 | Execution complete | 22:32 | 22:57 |
| B-4 | Suspend(SS) | 22:32 | |
| B-5 | Suspend(wait) | | |
| B-6 | Executable | | |
| ... | ... | ... | ... |
| B-11 | Executable | | |
| C | Unexecutable | | |
| TxID | | | |

FIG. 22

State management information
2200

| Object ID | State | Start time | End time |
|---|---|---|---|
| A-1 | Execution complete | 18:00 | 18:32 |
| A-2 | Execution complete | 18:00 | 18:28 |
| ... | ... | ... | ... |
| A-35 | Suspend(SS) | 21:52 | |
| B-1 | Unexecutable | | |
| B-2 | Unexecutable | | |
| B-3 | Unexecutable | | |
| B-4 | Unexecutable | | |
| B-5 | Unexecutable | | |
| B-6 | Unexecutable | | |
| ... | ... | ... | ... |
| B-11 | Unexecutable | | |
| C | Unexecutable | | |
| TxID | | | |

DATABASE MANAGEMENT SYSTEM AND DATABASE MANAGEMENT METHOD

CROSS-REFERENCE TO PRIOR APPLICATION

This application relates to and claims the benefit of priority from Japanese Patent Application number 2019-25453, filed on Feb. 15, 2019 the entire disclosure of which is incorporated herein by reference.

BACKGROUND

The present invention generally relates to database management and particularly relates to suspension of query processing.

Cases where it is desirable to suspend and resume query processing according to a query to a database are possible. Technologies relating to suspending and resuming query processing include the technologies disclosed in Non-PTL1 and Non-PTL 2.

According to Non-PTL1, a suspend/resume method with the smallest total cost is selected from two types of suspend/resume method, namely, DumpState, where suspend is implemented by outputting a heap (execution state) and resume is implemented by reading the heap, and GoBack, where suspend is implemented by discarding processing being executed and processing is resumed from a suitably configured mid-execution checkpoint, and suspend and resume are performed according to the selected suspend/resume method.

According to Non-PTL 2, during suspend, part of the suspend result is dumped and upon resume, parts other than the dumped part are scanned.

[Non-PTL1] Badrish Chandramouli et al., "Query Suspend and Resume", SIGMOD '07 Jun. 12-14, 2007, Beijing, China

[Non-PTL2] Surajit Chaudhuri, et al., "Stop-and-Restart Style Execution for Long Running Decision Support Queries", VLDB '07, Sep. 23-28, 2007, Vienna, Austria

SUMMARY

Cases where a query processing suspend must be completed at or before a suspend completion time are possible. For example, possible cases include a case where, in order to avoid a performance drop of first query processing that is performed in the daytime when power consumption increases or to avoid any additional increase in power consumption in the daytime, a second query processing suspend performed at nighttime is completed at or before a daytime start time.

However, neither Non-PTL 1 nor Non-PTL2 discloses or mentions technology for completing a query processing suspend at or before a suspend completion time. Therefore, the foregoing second query processing suspend cannot be completed at or before a daytime start time, for example, and, as a result, there may be problems such as a performance drop in the foregoing first query processing in the daytime or an additional increase in power consumption in the daytime.

Although methods for suspending query processing immediately are conceivable, there are concerns, when using such methods, about a drop in the rate of progress of the query processing or an increase in the amount of data being dumped.

A database management system (DBMS) is capable of receiving a suspend instruction in which the completion time for a query processing suspend is a future time. During execution of query processing, when a DBMS receives the suspend instruction for the query processing and between receipt of the suspend instruction and the suspend completion time, if there is a target object whose predicted completion time is at or precedes the suspend completion time, the DBMS changes the state of the target object to a state signifying a snapshot suspend. A processing object which is in a state signifying execution in progress upon receipt of the suspend instruction is at least categorized as the target object. If there is a snapshot suspend object, which is a processing object whose state signifies a snapshot suspend, the DBMS executes the snapshot suspend object at or before the suspend completion time.

It is possible to complete a query processing suspend at or before the suspend completion time by suppressing a drop in the query processing progress rate and curbing the amount of data which is saved during suspension.

BRIEF DESCRIPTION OF THE DRAWINGS

FIG. 7 illustrates an example of object list information according to Embodiment 1.

FIG. 8 illustrates an example of transaction management information according to Embodiment 1.

FIG. 9 illustrates an example of state management information (information before suspend instruction is received) according to Embodiment 1.

FIG. 15 illustrates an example of state management information (information after suspend instruction is received) according to Embodiment 1.

FIG. 19 illustrates an example of object list information according to Embodiment 2.

FIG. 20 illustrates an example of state management information according to Embodiment 2.

FIG. 22 illustrates an example of state management information according to Embodiment 3.

DESCRIPTION OF EMBODIMENTS

Figure 1:
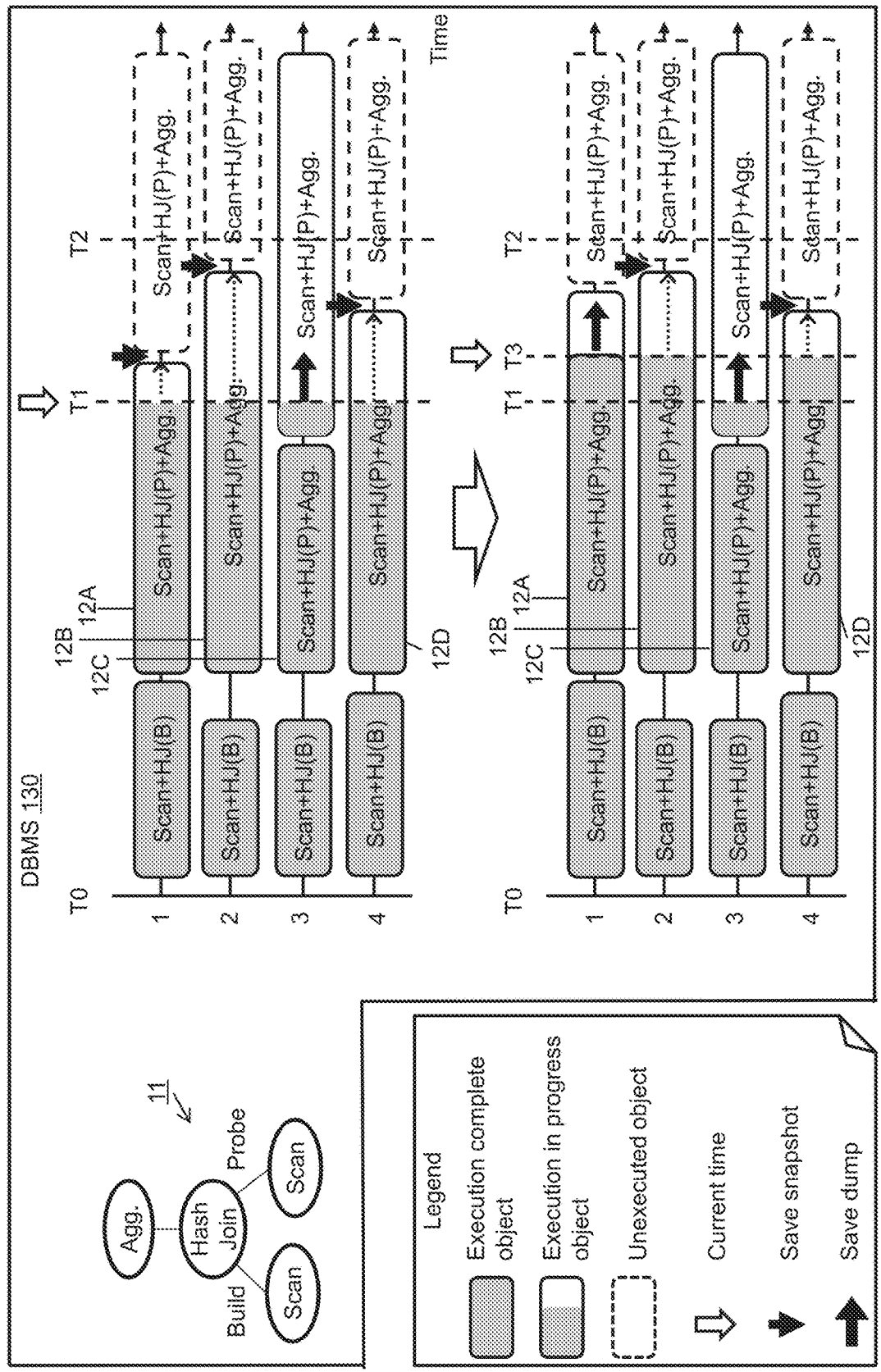
FIG. 1 provides an overview of an Embodiment 1.

In the description hereinbelow, a database management system is called a "DBMS," and a server including a DBMS is called a "DB server." The source of a query to the DBMS may be a computer program (an application program, for example) which is external to the DBMS. An external computer program may be a program that is executed in a DB server or a program that is executed by a client of the DB server.

In the description hereinbelow, an "interface apparatus" may be one or more interface devices. The one or more interface devices may be one or more communication interface devices of the same type (for instance, one or more MC (Network Interface Cards)) or may be two or more communication interface devices of different types (for instance, an MC and an HBA (Host Bus Adapter)).

Furthermore, in the description hereinbelow, "memory" may be one or more memory devices and may, typically, be a main storage device. At least one of the memory devices in the memory may be a volatile memory device or may be a nonvolatile memory device.

In addition, in the description hereinbelow, a "permanent storage apparatus" is one or more permanent storage devices. A permanent storage device is typically a nonvolatile storage device (an auxiliary storage device, for instance), and is specifically an HDD (Hard Disk Drive) or SDD (Solid State Drive), for example.

In addition, in the description hereinbelow, of a memory and a permanent storage apparatus, "storage apparatus" may be at least a memory.

In addition, in the description hereinbelow, "processor" is one or more processor devices. At least one processor device is typically a microprocessor like a CPU (Central Processing Unit) but could also be another type of processor device such as a GPU (Graphics Processing Unit). At least one processor device could also be a single-core or multi-core processor. At least one processor device could also be a processor core. At least one processor device could also be a processor in a broader sense such as a hardware circuit which performs some or all of the processing (an FPGA (Field-Programmable Gate Array) or ASIC (Application Specific Integrated Circuit), for example).

Furthermore, in the description hereinbelow, although functions are sometimes explained by means of the expression "kkk unit," the functions may also be realized as a result of one or more computer programs being executed by a processor or may be realized by one or more hardware circuits (for example, an FBGA or ASIC). When the functions are realized as a result of programs being executed by a processor, prescribed processing is performed while suitably using a storage apparatus and/or an interface apparatus, and the like, and hence the functions may be implemented by at least a portion of a processor. Processing which is explained with the function serving as the subject of the sentence may be processing that is performed by a processor or by an apparatus which comprises a processor. A program could also be installed from a program source. A program source could also be a program distribution computer or a computer-readable recording medium (for example, a non-temporary recording medium), for example. The description of each function is an example, and a plurality of functions could also be aggregated as one function, or one function could also be divided into a plurality of functions.

In addition, in the description hereinbelow, "query processing" is processing according to a query. Query processing is configured from a plurality of processing objects. A "processing object" is a query processing portion. The respective costs of a plurality of processing objects may be the same or different. Costs of processing objects include, for example, a "time period cost," which is the time period required to execute a processing object, and a "power cost," which is the electrical power consumption of the processing object.

Furthermore, in the description hereinbelow, when elements of the same type are described without distinction, a reference sign part common to the reference signs is sometimes used, and when elements of the same type are described with distinction, reference signs are sometimes used. For example, when processing objects are described without distinction, the processing objects are sometimes cared "processing objects 12," and when the processing objects are described with distinction, same are referred to as "processing object 12A," and "processing object 12B."

A few embodiment examples will be described hereinbelow with reference to the drawings. Note that the present invention is not limited to or by the following description.

Embodiment 1

FIG. 1 provides an overview of an Embodiment 1.

A DBMS 130 is configured to be able to receive, while query processing is being executed, a suspend instruction which uses a future time as a suspend completion time for the query processing.

In this embodiment example, query processing is performed according to a query execution plan (execution plan hereinbelow) which is generated on the basis of a query received by the DBMS 130. The DBMS 130 is configured to execute a plurality of processing objects which constitute query processing according to the execution plan. An example of the execution plan is an execution plan 11 illustrated in FIG. 1. An example of a plurality of processing objects according to the execution plan 11 are a plurality of processing objects 12 illustrated in FIG. 1. "HJ" signifies a hash join, and "Agg." signifies aggregation. In addition, according to the example in FIG. 1, query processing can be executed using four parallel threads (an N-parallel example), that is, the four largest processing objects 12 can be executed in parallel.

Processing object states include "execution complete," "execution in progress," and "unexecuted," for example. Furthermore, "unexecuted" includes at least "unexecutable" and "executable."

Suppose that the DBMS 130 receives a suspend instruction at a time T1 while execution of query processing is in progress. In this case, if there is a target object whose predicted completion time is at or precedes a suspend completion time T2, between time T1 and the suspend completion time T2, the DBMS 130 changes the state of the target object to "suspend (SS)" (a state signifying a snapshot suspend). Snapshot suspend is a processing object suspend method which advances execution of a processing object until a state affording a favorable breakpoint is reached and saves the execution state. For example, in this embodiment example, all processing of scanned target data is executed. Processing objects 12A to 12D, which are in the state "execution in progress" upon receipt of the suspend instruction are at least categorized as the "target object."

More specifically, for example, the DBMS 130 executes a suspend determination for each of the processing objects 12A to 12D in which it is determined whether or not a predicted completion time of the processing objects 12 is at or precedes a suspend completion time T2. According to the example in FIG. 1, the result of the suspend determination is true for each of the processing objects 12A, 12B, and 12D. The DBMS 130 changes each of the states of the processing objects 12A, 12B, and 12D to "suspend (SS)."

Note that, in this embodiment example, the "suspend completion time" is a time designated by means of a suspend instruction as the time the suspend is completed, but may instead be a time corresponding to the moment a fixed time period has elapsed since time T1. Designating the suspend completion time T2 may entail designation of the time itself or designation of the time period that has elapsed since time T1 or a suspend instruction time stamp (transmission time, for example). In addition, in this embodiment example, "suspend determination" is performed at time T1, but may instead by performed at a time after a fixed time period has elapsed since time T1 or the suspend instruction time stamp, or may be a time a fixed time period before suspend completion time T2.

If there is a snapshot suspend object (a processing object whose state is "suspend (SS))," the DBMS 130 executes the snapshot suspend object at or before the suspend completion time T2. According to the example in FIG. 1, each of the processing objects 12A, 12B and 12D is a snapshot suspend object.

According to the embodiment example, at least a suspend determination is made for the processing objects being executed at time T1, and if the result of the suspend determination is true, execution of the processing objects continues. Therefore, it is possible to complete the query processing suspend at or before the suspend completion time by suppressing a drop in the query processing progress rate and curbing the amount of data saved during suspension. In addition, efficient processing management according to dynamic power fluctuations (external peak cut requirements, for example) is also to be expected.

If there is a target object whose predicted completion time is after the suspend completion time, the DBMS 130 changes the state of the target object to "suspend (DP)" (a state signifying a dump suspend). If there are any dump suspend objects (processing objects whose state is "suspend (DP)"), the DBMS 130 executes a dump save which entails saving a dump containing mid-execution information of the objects. According to the example in FIG. 1, a "target object whose predicted completion time is after the suspend completion time" is the processing object 12C for which the suspend determination result is false, and the state of the processing object 12C is changed to "suspend (DP)." As a result, a dump save is executed for the processing object 12C.

It is conceivable that at least one snapshot suspend object will likely not be complete by the predicted completion time of the object due to the load on the computational resource executing the object or for another reason.

Thus, in this embodiment example, the DBMS 130 monitors each of the snapshot suspend objects to determine whether or not the object is to be completed at or before the predicted completion time. If there is a snapshot suspend object whose predicted completion time is before the current time, the DBMS 130 changes the state of the snapshot suspend object to "suspend (DP)." According to the example in FIG. 1, because there is a snapshot suspend object 12A whose predicted completion time precedes the current time T3, the DBMS 130 changes the state of the snapshot 12A to "suspend (DP)." In this case, a dump save is consequently executed for the processing object 12A.

Furthermore, if there is a snapshot suspend object whose predicted completion time is after the current time, the DBMS 130 corrects the predicted completion time on the basis of the progress of the snapshot suspend object. If the corrected predicted completion time precedes the current time, the DBMS 130 changes the state of the snapshot suspend object to "suspend (DP)." Accordingly, the reliability of suspending query processing at or before the suspend time can be improved.

An embodiment example will be explained in detail hereinbelow.

Figure 2:
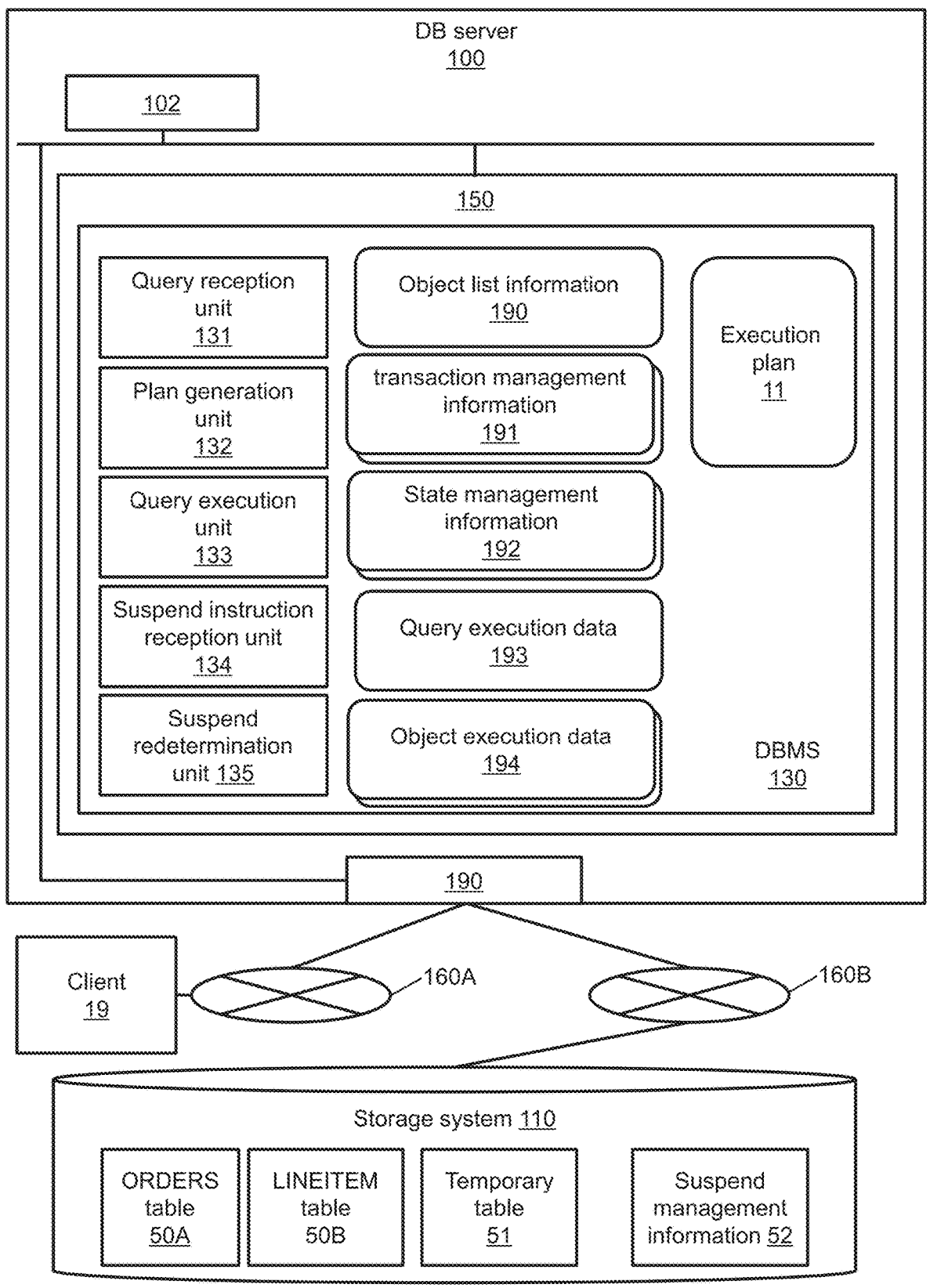
FIG. 2 illustrates a configuration example of a whole system including a DB server which executes a DBMS according to Embodiment 1.

FIG. 2 illustrates a configuration example of a whole system including a DB server which executes a DBMS according to Embodiment 1.

The DB server 100 is an example of a computer system. The DB server 100 may, for example, be a personal computer, a workstation or a mainframe, may be a virtual computer configured from a virtualization program in such computers, or may be realized in a cloud environment (a computational resource pool including, for example, a plurality of computational resources such as an interface device, storage device, and processor).

A client 19 and a storage system 110 are coupled to the DB server 100.

More specifically, for example, the client 19 is coupled to the DB server 100 via a network 160A. The client 19 is an example of a query issuing source and issues a database query to the DB server 100.

In addition, for example, the storage system 110 is coupled to the DB server 100 via a network 160B. The storage system 110 includes a storage apparatus. Upon receiving an I/O (Input/Output) request from the DB server 100, the storage system 110 executes a data I/O to/from the storage apparatus in response to the I/O request. The storage system 110 stores, as part of the database, for example, an ORDERS table 50A (an example of a search target table) and a LINEITEM table 50B (an example of a search target table). In addition, in query processing, the storage system 110 stores an temporary table 51 (a temporary table in which suspend results during query processing (a scanned portion of a table, for example) are stored) by means of the DBMS 130. In addition, when a query processing suspend is performed, the storage system 110 also stores, by means of the DBMS 130, suspend management information 52, which is information that is output in a query processing suspend and used to resume query processing.

The networks 160A and 160B may be networks with different communication speeds and power consumption, or the networks 160A and 160B may be the same network. For example, the networks 160A and 160B may each be an FC (Fibre Channel) network, an Ethernet (registered trademark), or an InfiniBand network or Local Area Network).

The DB server 100 includes an interface apparatus 101, a memory 150, and a processor 102 which is coupled to the interface device 101 and memory 150. The DB server 100 may include an input device (not illustrated) such as a keyboard or pointing device, and an output device (not shown) such as a liquid crystal display. The input device and output device may be coupled to the processor 102. The input device and output device could also be integrated.

The interface apparatus 101 is coupled to the networks 160A and 160B. The DB server 100 is capable of communicating with the storage system 110 and client 19 via the interface apparatus 101 (via the networks 160A and 160B).

The memory 150 stores programs which are executed by the processor 102 and data used by the programs. Programs include, for example, the DBMS 130 and an OS (Operating System) 120. The DBMS 130 receives queries from the client 19 and executes the queries. In executing the queries, the DBMS 130 issues an I/O request to the OS 120 in order to read data from the database and write data to the database. The OS 120 receives the I/O request, issues the I/O request to the storage system 110 based on the I/O request, and sends back the result to the DBMS 130.

The DBMS 130 includes a query reception unit 131, a plan generation unit 132, a query execution unit 133, a suspend instruction reception unit 134, and a suspend redetermination unit 135. Note that the configuration of the DBMS 130 is merely an example. For example, certain constituent elements may be divided into a plurality of constituent elements, and a plurality of components may be integrated into one constituent element. For example, the suspend instruction reception unit 134 may be inside the query execution unit 133.

The query reception unit 131 receives a database query from the client 19. The query is described using SQL (Structured Query Language), for example.

The plan generation unit 132 generates an execution plan 11 that is required to execute the query, on the basis of the received query. The execution plan 11 is information that includes one or more database operators and execution order relationships of the database operators, for example. The execution plan 11 is sometimes represented by a tree structure in which the database operators are nodes and the execution order relationships of the database operators are edges, for example.

The query execution unit 133 executes query processing on the basis of the generated execution plan 11, and sends back a response indicating the result of the query processing to the client 19. Note that, in the query processing, the query execution unit 133 is capable of generating tasks for executing the database operators, and by executing the generated task, is capable of issuing a request to read the data required by the database operators corresponding to the task. The query execution unit 133 may execute a plurality of database operators in one task. As task implementation, for example, in addition to processes, kernel threads, and the like, which are realized by the OS 120, user threads that are realized by a library or the like may be used.

The suspend instruction reception unit 134 receives a suspend instruction in which the suspend completion time for query processing is a time ahead of the current time.

If there is a snapshot suspend object whose predicted completion time is after the current time, the suspend redetermination unit 135 corrects the predicted completion time on the basis of the progress of the snapshot suspend object. If the corrected predicted completion time exceeds the current time, the suspend redetermination unit 135 changes the state of the snapshot suspend object to "suspend (DP)."

The DBMS 130 manages object list information 190, transaction management information 191, state management information 192 query execution data 193, and object execution data 194. The query processing includes one or more transaction processes, and the object list information 190, transaction management information 191, and state management information 192 exist for each transaction process. The query execution data 193 exists for each query. Although omitted from the drawings, information indicating the correspondence relationships between tasks and one or more transaction processes (TxID) corresponding to the tasks may also be managed by the DBMS 130.

The object list information 190 saves information relating to all of the respective processing objects that belong to the transaction processing corresponding to the information 190.

The transaction management information 191 holds information relating to the transaction processing corresponding to the information 191. In this embodiment example, the transaction processing is a plurality of processes each corresponding to a plurality of requests (for example, CONNECT, PREPARE, OPEN, FETCH, CLOSE, AND DISCONNECT, described subsequently) issued by the client 19 from the start of query processing until its completion.

The state management information 192 holds information relating to the respective states of all the processing objects that belong to the transaction processing corresponding to the information 192.

The query execution data 193 is data obtained in executing query processing and is a hash table in this embodiment example.

The object execution data 194 exists in a quantity corresponding to a parallelism N of the query processing. For example, if N=4, first to fourth object execution data 194 exist. The object execution data 194 is data that is obtained in executing processing objects (a detailed example will be described subsequently with reference to FIG. 10).

The whole system according to the embodiment example has been described hereinabove.

Figure 3:
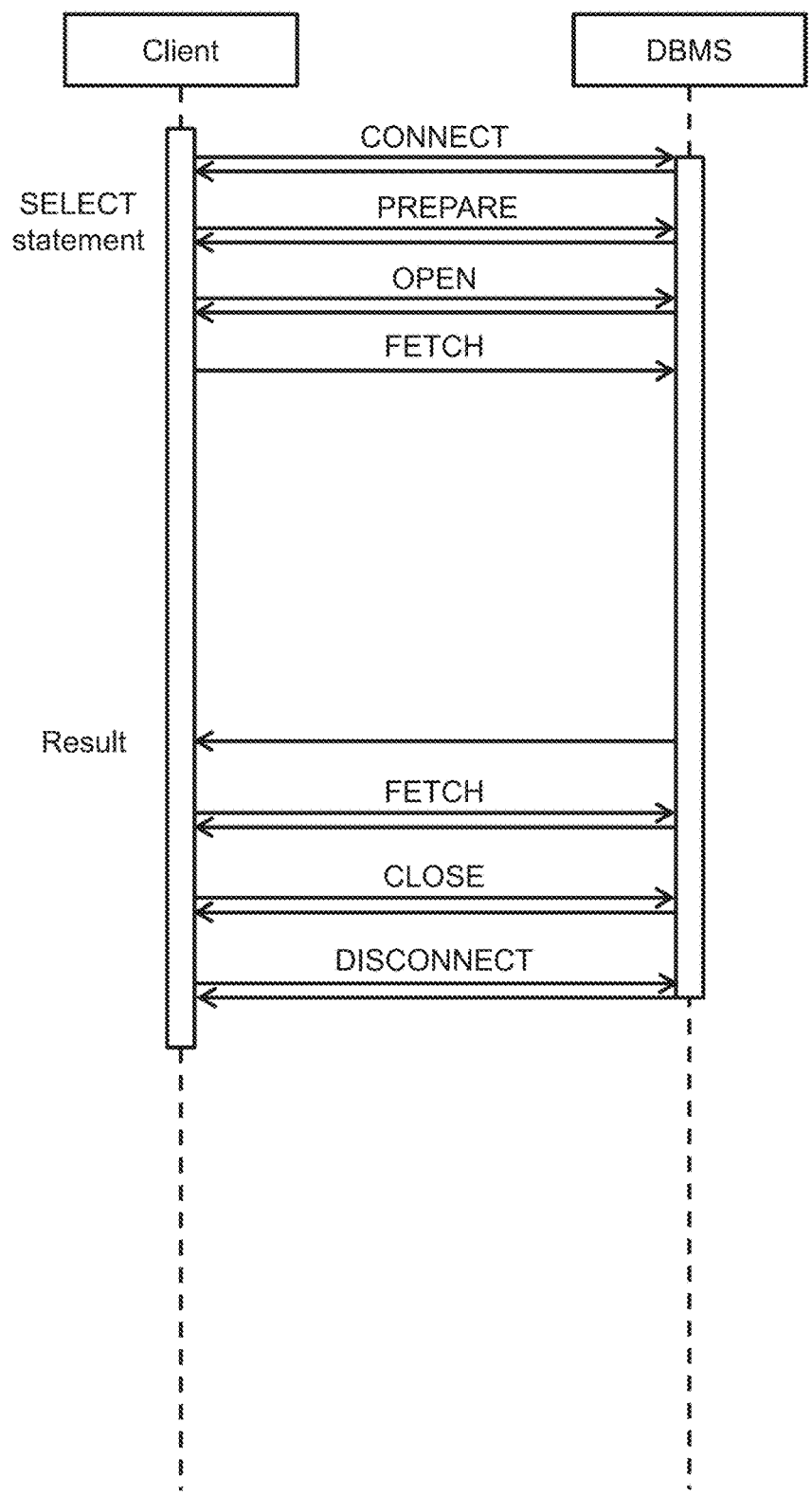
FIG. 3 illustrates an example of query processing (not including suspend and resume).

In the system shown in FIG. 2, the reception of one query is started as a result of receiving a CONNECT request, as illustrated in FIG. 3. An execution plan is generated as a result of receiving a DECLARE CURSOR request and an OPEN request. Query processing based on the execution plan is executed as a result of receiving one or more FETCH requests. Processing of the one query ends as a result of receiving a CLOSE request and a DISCONNECT request.

Figure 4:
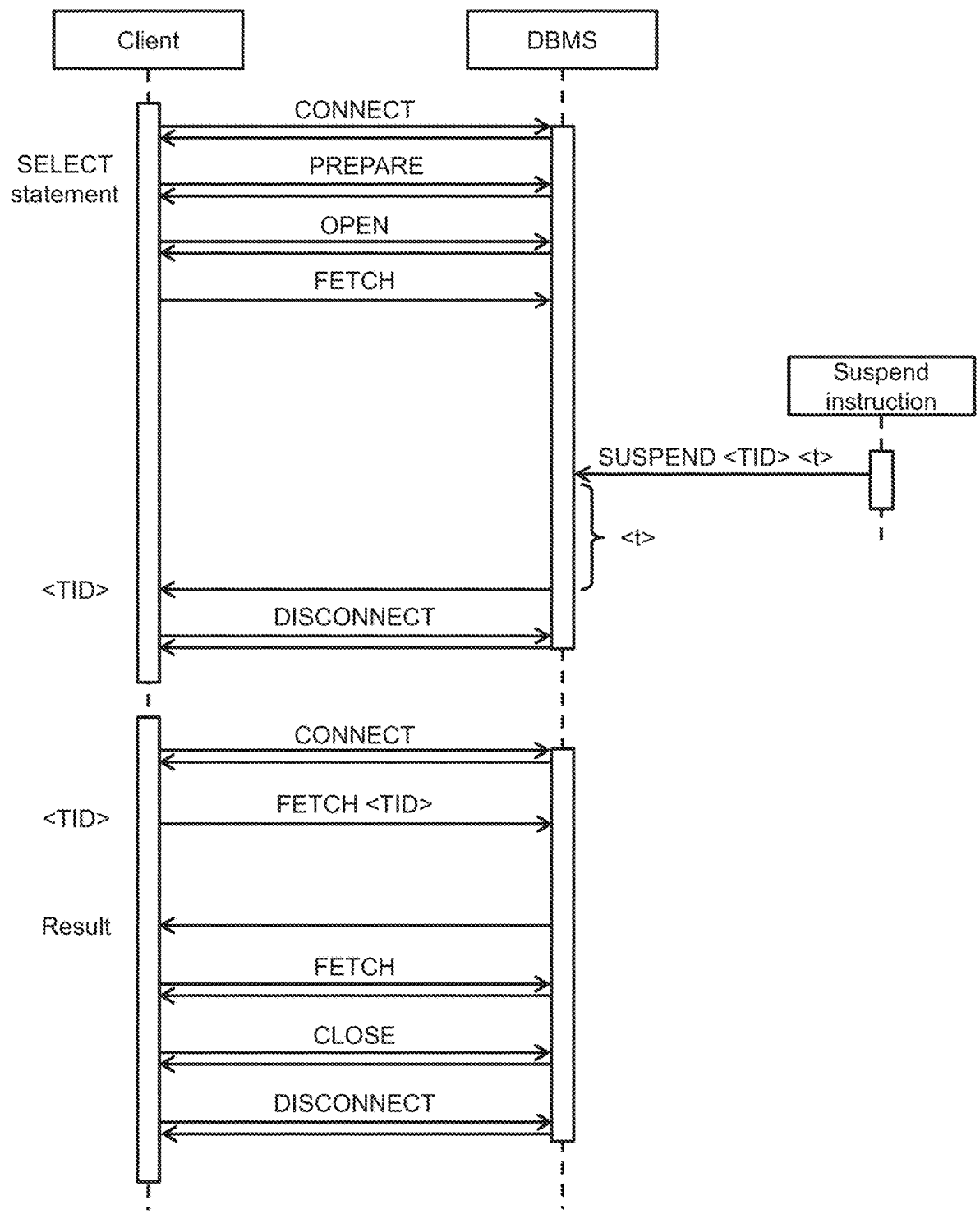
FIG. 4 illustrates an example of query processing (including suspend and resume).

Here, as illustrated in FIG. 4, when the suspend instruction reception unit 134 receives a query processing suspend instruction during execution of the query processing (for example, after a FETCH request is received and before a FETCH response (a response to the FETCH request) is sent back), the query processing is suspended. The suspend instruction may be issued by the client 19 or may be issued within the DB server 100. Designated in the suspend instruction are, for example, a TxID (the ID of the transaction processing which is the suspend target), and a required suspension time period t. Here, the TxID is the ID of the transaction processing according to the FETCH request.

In response to the suspend instruction, the query execution unit 133 suspends query processing after the suspend instruction is received and within the required suspension time period t, and transmits, to the query processing resume subject, a suspend notification indicating a query processing suspend and containing the TxID of the suspended transaction processing. In this embodiment example, the "resume subject" is the client 19 which is an example of a query issuing source, and the FETCH response doubles as a "suspend notification." Accordingly, in this embodiment example, efficient notification of a query suspend is performed. When the client 19 has received the FETCH response which doubles as a suspend notification, the client 19 transmits a DISCONNECT request.

The TxID contained in the suspend notification is used for query processing resumption by the resume subject. In this embodiment example, a FETCH request containing the TxID obtained from the FETCH response (that is, a FETCH request which doubles as a resume instruction) is transmitted from the client 19, and in response to the FETCH request, query processing is resumed via resume processing (processing which includes the suspend management information 52 being read by the query execution unit 133 by using the TxID).

Figures 5, 6:
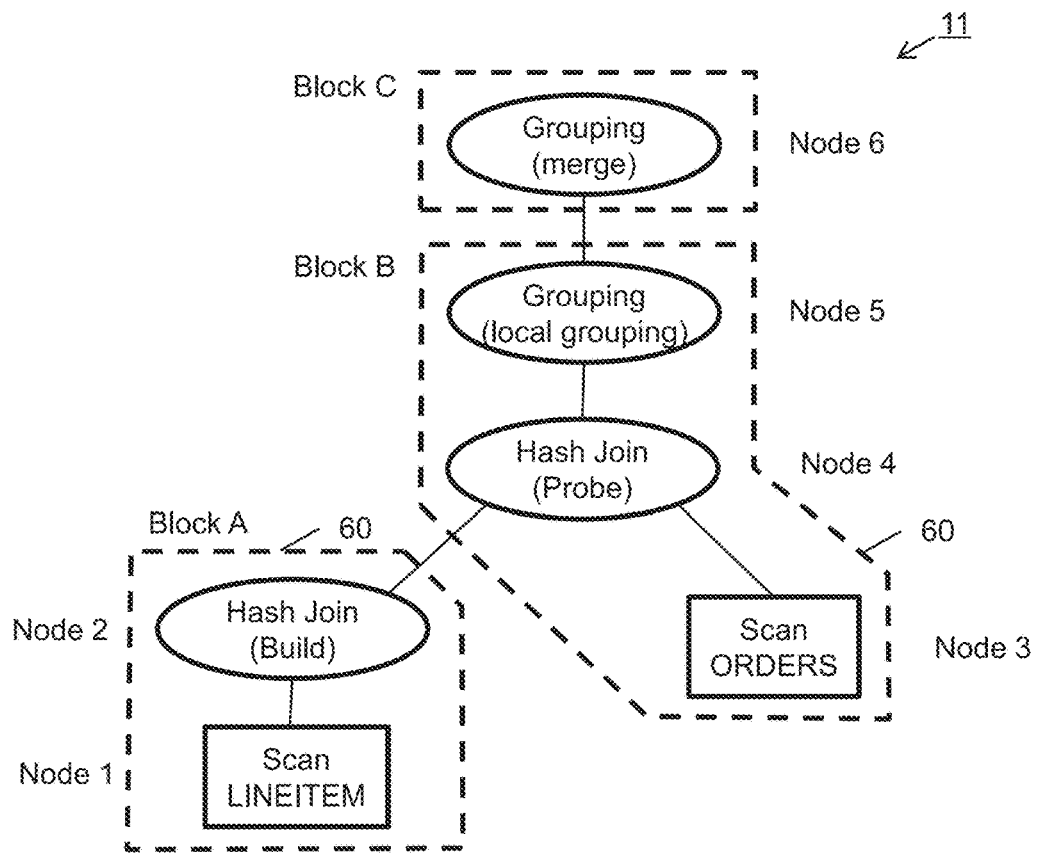
FIG. 5 illustrates an example of a query.
FIG. 6 illustrates an example of an execution plan.

FIG. 5 illustrates an example of a query according to the embodiment example. FIG. 6 illustrates an example of an execution plan based on the query illustrated in FIG. 5. The execution plan is divided into a plurality of blocks (or one block) 60. The block 60 is in a processing range enabling simultaneous execution and is configured from one or more database operators. For each block 60, there are one or more processing objects that constitute the block 60.

FIG. 7 illustrates an example of object list information 190.

The object list information 190 contains, in addition to a TxID 701 indicating the ID of the transaction processing corresponding to the information 190, an entry for each processing object that belongs to the transaction processing. Each entry holds information such as an object ID 702, a time period cost 703, a block ID 704, and target data 705. One processing object is taken as an example hereinbelow ("object of interest" in the description of FIG. 7).

The object ID 702 indicates the ID of the object of interest. According to the example in FIG. 7, the ID of the object of interest is a combination of the ID of the block to which the object of interest belongs and a serial number of the object of interest in the block (for example, if the object of interest is the first processing object in a block A, the object ID is "A-1." The time period cost 703 indicates the time period cost of the object of interest, that is, the time period required to execute the object of interest (units are "minutes," for example). The block ID 704 indicates the ID of the block to which the object of interest belongs. The target data 705 indicates the data accessed through execution of the object of interest. In FIG. 7, a "segment" signifies one portion of a database constituent element such as a table or an index, and more specifically, for example, signifies all or a portion of one or more records or all or a portion of one or more columns. In this embodiment example, a "segment" signifies a plurality of records.

The time period cost of an object of interest can be calculated by using an existing technology. For example, the time period cost of an object of interest can be calculated by any of the following.

$$\text{read size} \div \text{I/O throughput} \quad (x1)$$

$$\text{number of items} \div \text{processing throughput} \quad (x2)$$

The larger of (x3), (x1), and (x2).

The "read size" is the size of the data indicated by the target data 705 of the object of interest (for example, segments #1 to #10 in the LINEITEM table). The "number of items" is the total number of records stored in the segments indicated by the target data 705 of the object of interest. The "I/O throughput" is the size of the data which is input/output per unit of time. The "processing throughput" is the number of records processed per unit of time. The I/O throughput and processing throughput may be predefined values or may be values calculated from a previous execution history.

In addition, in this embodiment example, all query-related processing objects are prelisted before the start of query processing, but processing objects may instead be dynamically specified according to query processing execution. For example, in executing query processing, the query execution unit 133 generates a processing object, and by executing the generated processing object, issues a request to read data required for the processing object, and when a new processing object must be executed based on the result of the read request, the query execution unit 133 may generate the new processing object.

FIG. 8 illustrates an example of transaction management information 191.

The transaction management information 191 holds, in addition to a TxID 801 indicating a transaction processing ID that corresponds to the information 191, a request type 802 indicating the type of request corresponding to the transaction processing, a suspend flag 803 indicating whether or not the transaction processing is a suspend target, and a suspend completion time 804 indicating a suspend completion time for the query processing.

For example, when the suspend instruction reception unit 134 receives, at 23:00, a suspend instruction designating the TxID of the transaction processing and a required suspension time period of "30 minutes," the suspend instruction reception unit 134 changes the suspend flag 803 to "ON" for the transaction management information 191 including the TxID 801 matching the TxID and configures a suspend completion time 804 of "23:30" (a time obtained by adding the required suspension time period of "30 minutes" to the reception time "23:00"). That is, the suspend completion time 804 is decided upon receipt of the suspend instruction. Note that the units of time may be units other than hours and minutes, such as year/month/day/hour/minutes/seconds, for example.

FIG. 9 illustrates an example of state management information 192.

The state management information 192 contains, in addition to a TxID 901 indicating the ID of the transaction processing corresponding to the information 192, an entry for each processing object that belongs to the transaction processing. Each entry holds information such as an object ID 902, a state 903, a start time 904, and an end time 905. One processing object is taken as an example hereinbelow ("object of interest" in the description of FIG. 9).

The object ID 902 indicates the ID of the object of interest. The state 903 indicates the state of the object of interest. The start time 904 indicates the start time of the object of interest. The end time 905 indicates the end time of the object of interest. Accordingly, when the object of interest is incomplete (that is, when the state 903 of the object of interest is not "execution complete"), the end time 905 of the object of interest is not configured.

The example in FIG. 9 is an example to which the four-thread parallel processing illustrated in FIG. 1 is applied. According to the example in FIG. 9, because block A is complete, the state 903 of the processing objects belonging to block B is "executable" or "execution in progress." In addition, the state 903 of the processing object belonging to block C is "unexecutable" until block B is complete.

In addition, in this embodiment example, query processing advances in block units. When a certain block is started, the query execution unit 133 configures the start time 904 of each processing object belonging to the block and, each time a processing object belonging to the block is complete, configures the end time 905 of the processing object.

Figure 10:
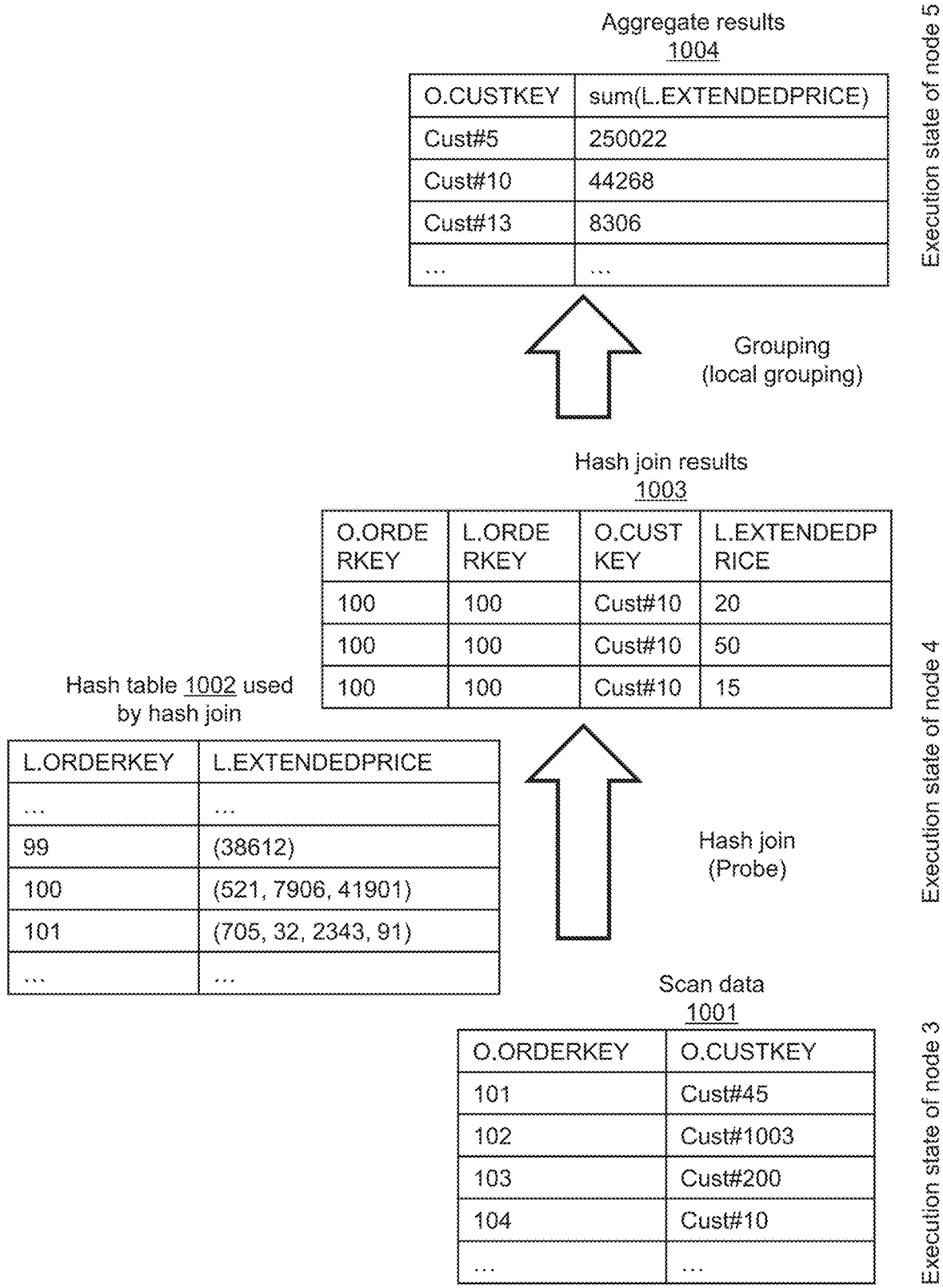
FIG. 10 illustrates an example of a dump.

FIG. 10 illustrates an example of a dump.

The example in FIG. 10 illustrates data generated in the memory 150 in the execution of nodes 3 to 5 which belong to block B (see FIG. 6). That is, scan data 1001 is generated as a result of the processing objects belonging to node 3 being executed. Hash join results 1003 are generated as a result of the processing object belonging to node 4 being executed by using the scan data 1001 and a hash table 1002 generated as the results for block A. Aggregate results 1004 are generated as a result of processing objects belonging to node 5 being executed by using the hash join results 1003.

In the example of FIG. 10, the hash table 1002 has been generated as the results for block A as mentioned above, and is data that is included in the query execution data 193. At least a portion of the scan data 1001, hash join results 1003, and aggregate results 1004 is data that is included in the object execution data 194.

Here, suppose that a query processing suspend is performed during execution of block B.

Among the processing objects belonging to block B, if there is no processing object whose state 903 is "suspend (DP)," there is no dump which is mid-execution information, and therefore a dump save is not performed. Note that, in this case, the state management information 192 (information 192 in which each "suspend(SS)" has been changed to "execution complete") and the hash table 1002 (an example of information relating to query execution states) are saved in the suspend management information 52 in the storage system 110. In addition, if there are completed aggregate results 1004 the appropriate table 1004 is saved in the temporary table 51.

If there is a processing object whose state 903 is "suspend (DP)" among the processing objects belonging to block B, a dump that includes all or some of the data 1001, 1003, and 1004 illustrated in FIG. 10 is saved in the suspend management information 52 in the storage system 110. In addition, the state management information 192 (information 192 including at least one "suspend (DP)," for example) is also saved in the suspend management information 52 in the storage system 110. Note that the hash table 1002 is not included in the dump. This is because this is not information pertaining to the processing objects belonging to block B rather, same is information relating to query execution states.

An example of the processing performed in this embodiment example will be explained hereinbelow.

Although omitted from the drawings, the following processing, for example, is performed in this embodiment example. That is, the query reception unit 131 receives a query from the client 19. The plan generation unit 132 generates an execution plan for the query. The query execution unit 133 executes query processing on the basis of this execution plan and sends back a response indicating the results of the query processing to the client 19. A detailed description relating to query processing will be provided with reference to FIGS. 11 to 16.

Figure 11:
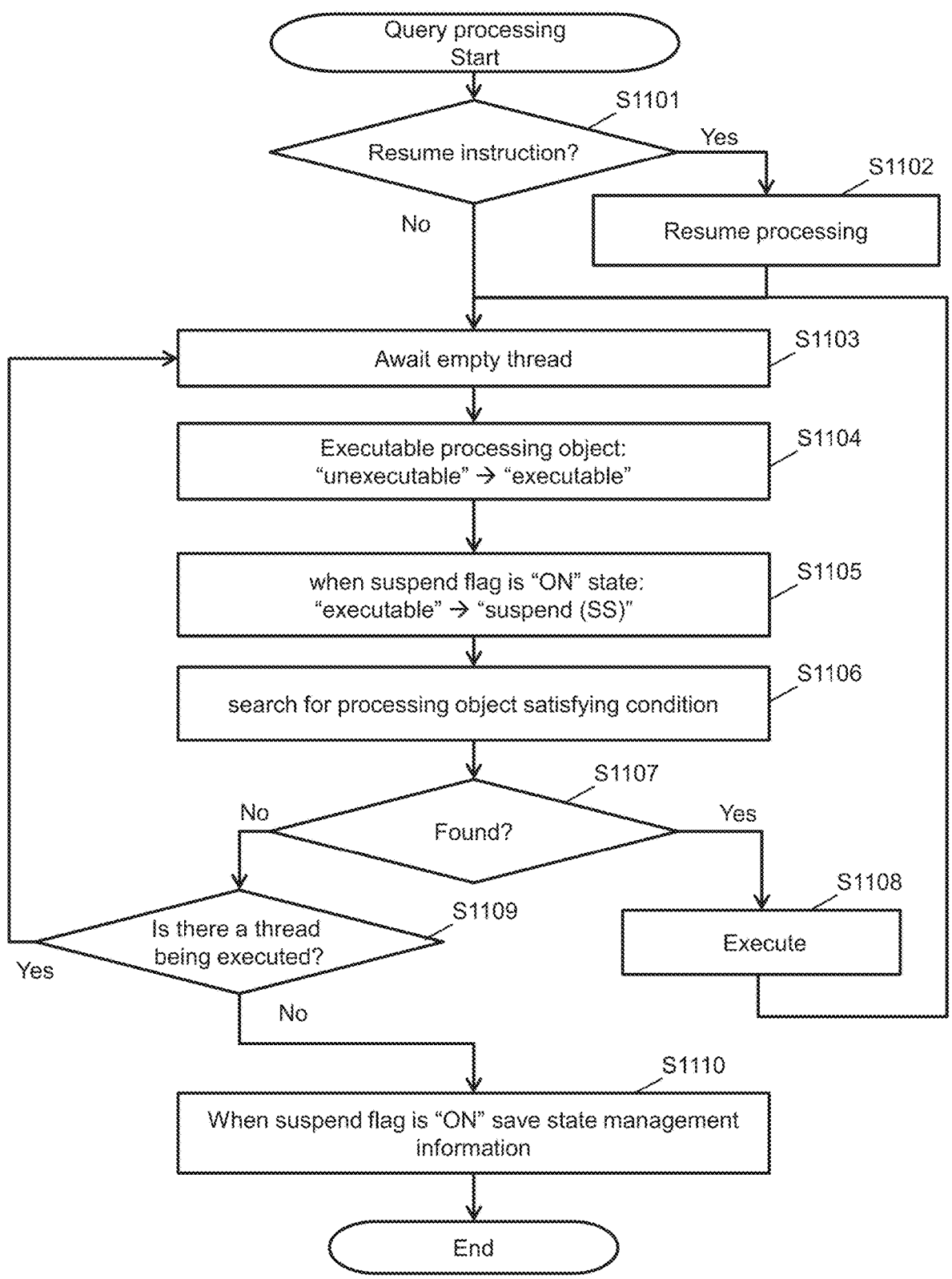
FIG. 11 shows the flow of query processing.

FIG. 11 shows the flow of query processing.

The query execution unit 133 determines whether or not there is a resume instruction (a FETCH request also doubling as a resume instruction, for example) (S1101). When the determination result of S1101 is true (S1101: Yes), the query execution unit 133 executes resume processing (S1102). Resume processing includes processing to acquire information required for resume (for example, information corresponding to the TxID associated with the resume instruction) from the suspend management information 52 (also from the operation table 51 if necessary) and restore the acquired information in the memory 150.

When the determination result of S1101 is false (S1101: No) or after S1102, the query execution unit 133 waits until an empty thread is available (a thread to which a processing object has not been allocated) (S1103). If there is an empty thread, S1103 is skipped. Furthermore, if an empty thread is generated as a result of a certain processing object ending, S1103 ends.

When at least one processing object whose state 903 is "unexecutable" is executable as a result of a certain processing object ending (as a result of a certain block ending, for example), the query execution unit 133 changes the state 903 of the processing object from "unexecutable" to "executable" (S1104).

When the suspend flag 803 corresponding to the transaction processing currently being executed (for example, the transaction processing to which the block currently being executed belongs) is "ON," if there is an executable object whose predicted completion time is at or precedes the suspend completion time (a processing object whose state 903 is "executable"), the query execution unit 133 changes the state 903 of the executable object from "executable" to "suspend (SS)" (S1105). Note that the predicted completion time of the object is a time obtained by adding the time period cost 703 for the object to the start time 904 of the object. In addition, when the suspend flag 803 is "OFF," S1105 is skipped.

The query execution unit 133 searches for processing objects satisfying a condition, more specifically, processing objects whose state 903 is "executable" or "suspend (SS)" from the state management information 192 (S1106). Here, "suspend (SS)" may also take precedence over "executable." This is because it is expected that "suspend (SS)" processing objects are more likely to be completed at or before the suspend completion time 804 if execution is started.

If a processing object satisfying the condition is found (S1107: Yes), the query execution unit 133 allocates an empty thread to the processing object and executes the processing object (S1108). According to S1105 to S1108, in addition to processing objects whose state 903 is "execution in progress," execution is also started for processing objects whose predicted completion time is at or precedes the suspend completion time and which are processing objects whose state 903 is originally "executable." Accordingly, it is to be expected that the execution of as many processing objects as possible will be completed at or before the suspend completion time. Note that the flow of processing objects whose execution has started is as per FIGS. 12 and 13.

If a processing object satisfying a condition is not found (S1107: No), the query execution unit 133 determines whether or not there is a thread whose execution is in progress (S1109). When the determination result of S1109 is true (S1109: Yes), the processing returns to S1103.

When the determination result of S1109 is false (S1109: No), if the suspend flag 803 is "ON" the query execution unit 133 saves the state management information 192 and the hash table 1002 in the suspend management information 52 (S1110). This save operation is performed irrespective of whether or not a dump save is executed, and is processing that is common in a query processing suspend. Note that, when the suspend flag 803 is "OFF," S1110 is skipped.

Figure 12:
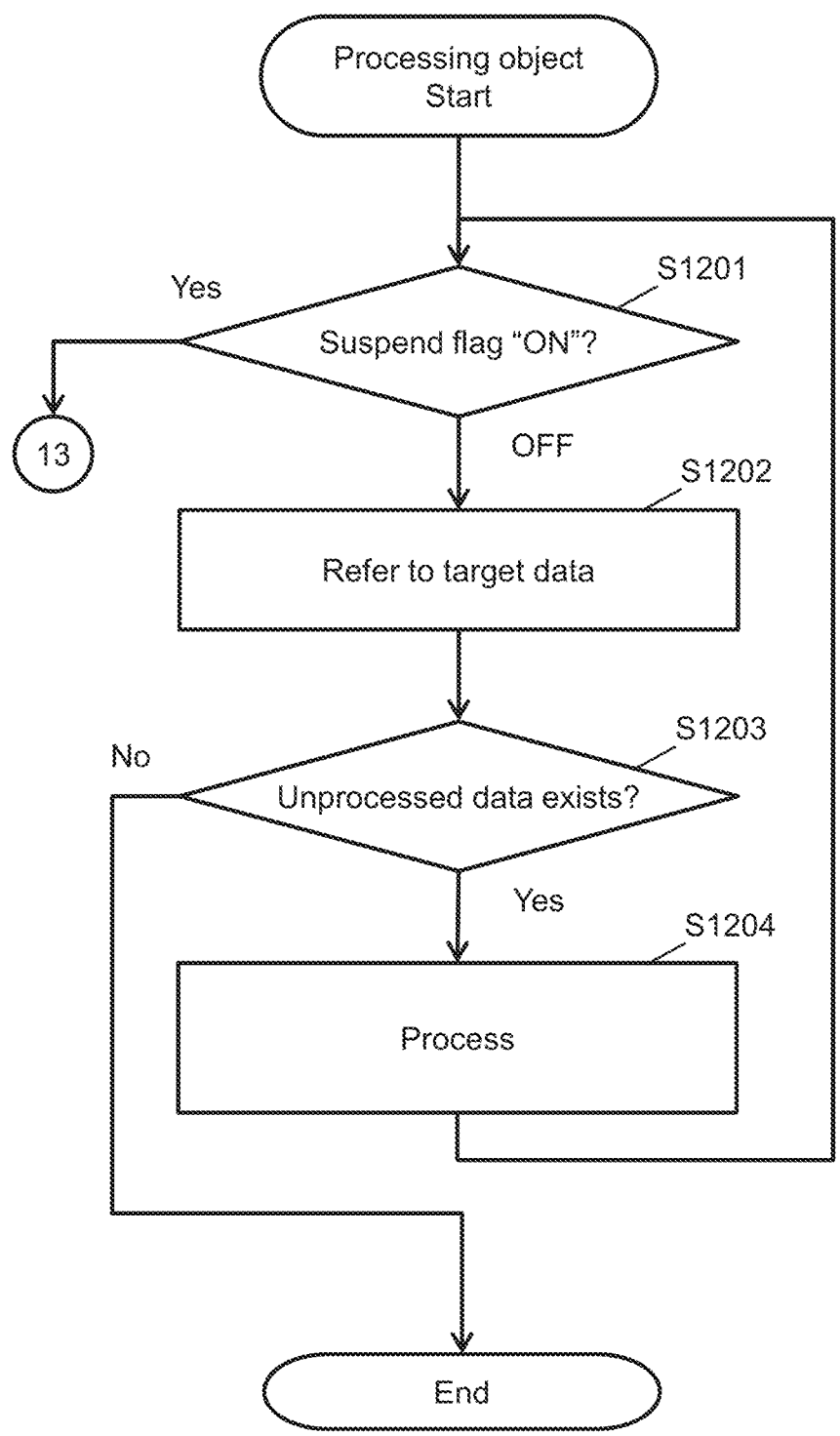
FIG. 12 illustrates part of a processing object execution flow.
Figure 13:
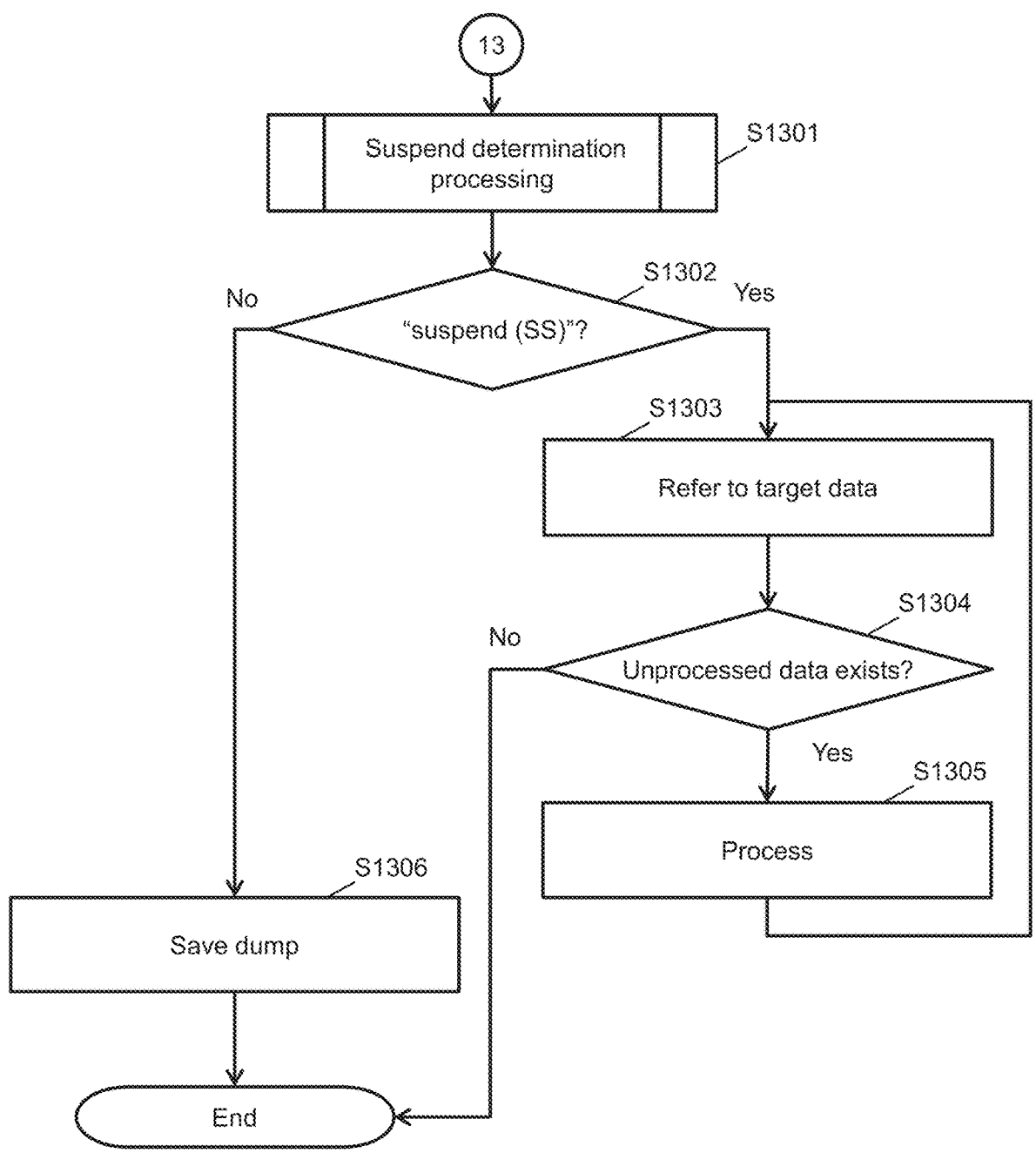
FIG. 13 illustrates the remainder of the processing object execution flow.
Figure 14:
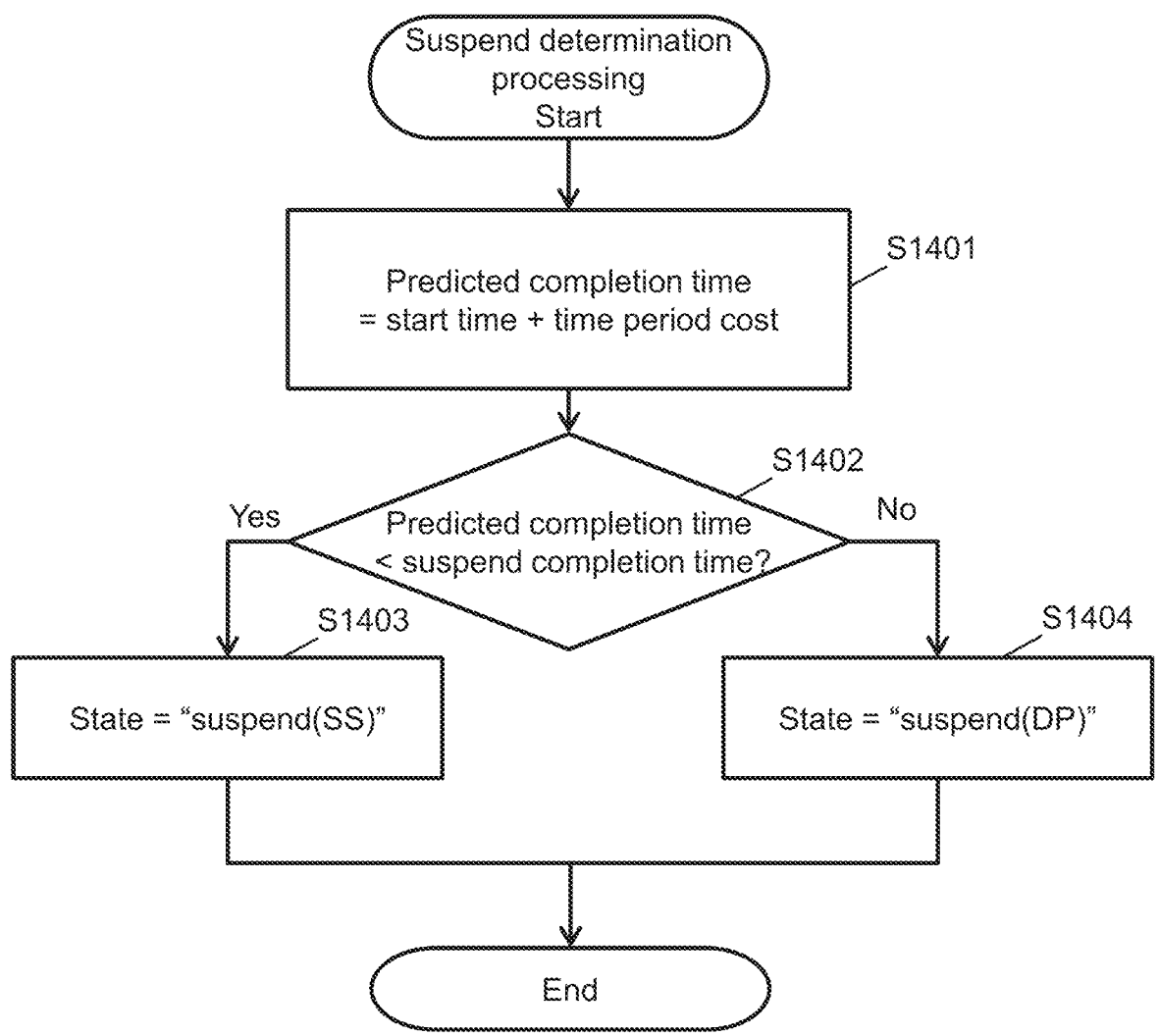
FIG. 14 illustrates a flow of suspend determination processing.

FIGS. 12 and 13 illustrate a processing object execution flow. FIG. 14 illustrates a flow of suspend determination processing in FIG. 13. In the description of FIGS. 12 to 14, one processing object is taken as an example ("object of interest" in the description of FIGS. 12 to 14).

The query execution unit 133 determines whether or not the suspend flag 803 corresponding to the transaction processing to which the object of interest belongs is "ON" (S1201).

When the determination result of S1231 is false (S1201: No), the query execution unit 133 refers to the target data 705 corresponding to the object of interest (S1204) and determines whether or not at least a portion of unprocessed data (for example, at least one unprocessed segment) exists among the data indicated by the target data 705 (S1203). When the determination result of S1203 is false (S1203:

No), the object of interest is complete. When the determination result of S1203 is true (S1203: Yes), the query execution unit 133 processes at least a portion of the data according to the database operator to which the object of interest belongs (S1204). After S1204, the processing returns to S1201. During execution of the object of interest, a suspend instruction designating the TxID of the transaction processing to which the object of interest belongs may be received and the suspend flag 803 may be changed to "ON."

When the determination result of S1201 is true (S1201: Yes), the query execution unit 133 performs suspend determination processing (S1301).

If, as a result of suspend determination processing, the state of the object of interest is "suspend (SS)" (S1302: Yes), the query execution unit 133 continues to execute the object of interest. That is, the query execution unit 133 refers to the target data 705 corresponding to the object of interest (S1303) and determines whether or not at least a portion of unprocessed data exists among the data indicated by the target data 705 (S1304). When the determination result of S1304 is true (S1304: Yes), the query execution unit 133 processes at least a portion of the data according to the database operator to which the object of interest belongs (S1305). After S1305, the processing returns to S1303. When the determination result of S1304 is false (S1304: No), the object of interest is complete. Note that, here, predetermined information which depends on at least one of a query, block, node, and database operator to which the object of interest belongs may also be saved in at least one of the temporary table 51 and suspend management information 52 in the storage system 110, However, the information amount of this predetermined information is normally smaller than the dump information amount of any processing object.

If, as a result of suspend determination processing, the state of the object of interest is not "suspend (SS)" (S1302: No), the query execution unit 133 stops the continued execution of the object of interest and saves a dump containing mid-execution information of the object of interest in the suspend management information 52 in the storage system 110 (S1306). Note that, here, the dump saved in S1306 depends on at least one of a query, block, node, and database operator to which the object of interest belongs.

FIG. 14 illustrates a flow of suspend determination processing.

The query execution unit 133 calculates the predicted completion time of the object of interest by adding the time period cost 703 of the object of interest to the start time 904 of the object of interest (S1401). The time period cost 703 of the object of interest is a value which is determined on the basis of information relating to the database operator to which the object of interest belongs, and therefore the predicted completion time of the object of interest is a completion time which is predicted on the basis of information relating to the database operator to which the object of interest belongs.

The query execution unit 133 determines whether or not the predicted completion time calculated in S1401 is at or precedes the suspend completion time 804 (S1402).

When the determination result of S1402 is true (S1402: Yes), the query execution unit 133 changes the state 903 of the object of interest to "suspend (SS)" (S1403).

When, on the other hand, the determination result of S1402 is false (S1402: No), the query execution unit 133 changes the state 903 of the object of interest to "suspend (DP)" (S1404).

As a result of suspend determination processing being performed for each of one or more processing objects in query processing, the state management information 192 illustrated in FIG. 9 becomes the state management information 192 illustrated in FIG. 15.

According to FIGS. 11 to 14, execution is continued (or execution is newly started) for a processing object whose state 903 is "suspend (SS)," and the object is completed at or before the suspend completion time.

However, the predicted completion time of a processing object is not necessarily accurate, and consequently, completion of the processing object may lag behind the predicted completion time. In this case, the query processing suspend is not completed at or before the suspend completion time.

Thus, in this embodiment example, the foregoing suspend redetermination unit 135, which executes suspend redetermination processing, is provided.

Figure 16:
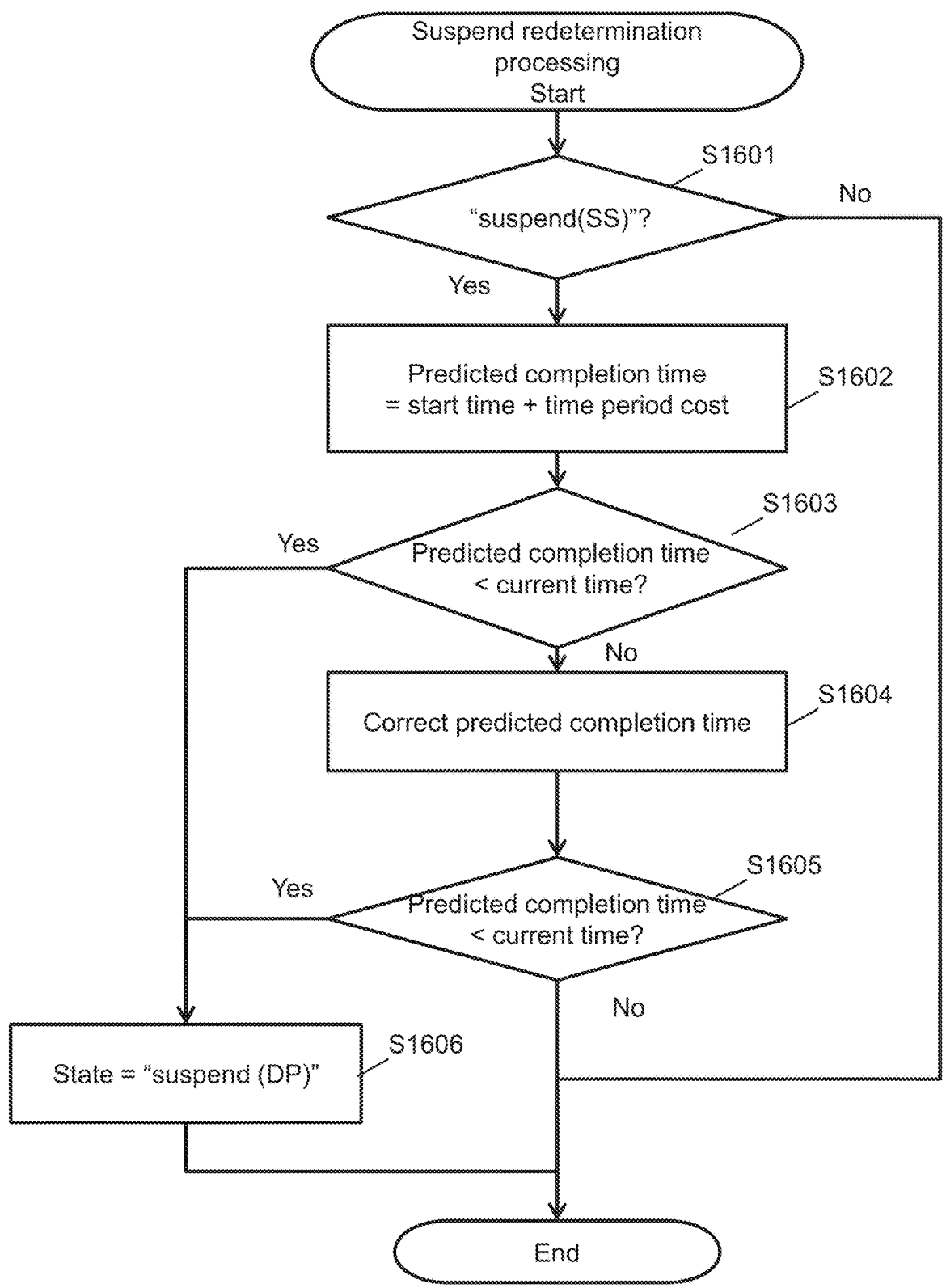
FIG. 16 illustrates the flow of suspend redetermination processing.

FIG. 16 illustrates a flow of suspend redetermination processing. In the description of FIG. 16, one processing object whose state 903 is a state other than "execution complete" is taken as an example ("object of interest" in the description of FIG. 16). The suspend redetermination processing according to this embodiment example is separate processing from query processing and is executed at regular intervals during execution of query processing, for example. Therefore, (in a case where S1105 has been executed, for example), suspend redetermination processing may sometimes be executed for processing objects for which the suspend determination processing of S1301 has not been executed.

The suspend redetermination unit 135 determines whether or note the state 903 of the object of interest is "suspend (SS)" (S1601). When the determination result of S1601 is false (S1601: No), the processing ends.

When the determination result of S1601 is true (S1601: Yes), the suspend redetermination unit 135 calculates the predicted completion time of the object of interest by adding the time period cost 703 of the object of interest to the start time 904 of the object of interest (S1602). Note that, in associating the predicted completion time calculated in S1301 for the object of interest with at least one of the object list information 190 and the state management information 192, if the predicted completion time can be specified from this information, S1602 may be skipped.

The suspend redetermination unit 135 determines whether or not the predicted completion time calculated in S1602 precedes the current time (S1603). However, "current time" here precedes the suspend completion time.

When the determination result of S1603 is true (S1603: Yes), the suspend redetermination unit 135 changes the state 903 of the object of interest from "suspend (SS)" to "suspend (DP)" (S1606). This is because S1603: Yes means that the current time has been exceeded while the object of interest remains incomplete, and in order to suspend query processing at or before the suspend completion time, a mid-execution suspend is appropriate for such an object of interest.

When the determination result of S1603 is false (S1603: No), the suspend redetermination unit 135 corrects the predicted completion time of the object of interest on the basis of the object of interest (S1604). More specifically, for example, the suspend redetermination unit 135 calculates a progress rate from the number of scanned segments and number of processed segments, calculates the remaining time period cost from the progress rate and remaining time period (the time period from the start time 904 of the object of interest to the current time), and calculates the predicted completion time after correction on the basis of the time period cost.

The suspend redetermination unit 135 determines whether or not the predicted completion time after correction precedes the current time (S1605).

When the determination result of S1605 is false (S1605: No), the processing ends. That is, the suspend redetermination unit 135 maintains that the state 903 of the object of interest is "suspend (SS)."

When the determination result of S1605 is true (S1605: Yes), the suspend redetermination unit 135 changes the state 903 of the object of interest from "suspend (SS)" to "suspend (DP)" (S1606).

As a result of this suspend redetermination processing being executed, execution is continued (or execution is newly started) even after a suspend instruction is received, but the expectation is that processing objects that will not be completed at or before the suspend completion time will not be generated.

The foregoing is a description of Embodiment 1. The time period cost for each of the processing objects may be calculated on the basis of the execution time period of the database operator to which the processing object belongs instead of or in addition to being calculated according to the method described with reference to FIG. 7. The execution time period for each of the database operators is based on at least one of the following, for example. One database operator is taken as an example hereinbelow (called "target database operator" hereinbelow).

At least one of the size of a table part that is accessed (input/output) by the target database operator, and the capacity of the storage area storing the table part. The size of the table part is based on the number of records constituting the table part and the size of one record, for example. The capacity of the storage area storing the table part is based on the number of pages storing the table part and the size of one page, for example. A logical storage area based on one or more permanent storage devices is provided as a database area, and the database area may be configured from a plurality of pages and accessed in page units.

At least one of the throughput of the target database operator and the latency of the target database operator. The throughput of the target database operator may be a minimum value among a plurality of throughputs corresponding to each of a plurality of devices (for example, one or more devices among the storage system 110, permanent storage devices, network 160, and DB server 100) relating to the target database operator, for example. This is because a device with minimal throughput can become a target database operator bottleneck. The latency of the target database operator may, for example, be a minimum value among a plurality of latencies corresponding to each of the plurality of devices relating to the target database operator.

Embodiment 2

An Embodiment 2 will be described hereinbelow. In so doing, points of difference from Embodiment 1 will mainly be described, while a description of points in common with Embodiment 1 will be omitted or simplified.

In Embodiment 2, a power consumption upper limit can be designated in a suspend instruction. When a power consumption upper limit is designated in a received suspend instruction, the power consumed in a query processing suspend is maintained at or below the power consumption upper limit.

Embodiment 2 will be described in detail hereinbelow.

Figures 17, 18:
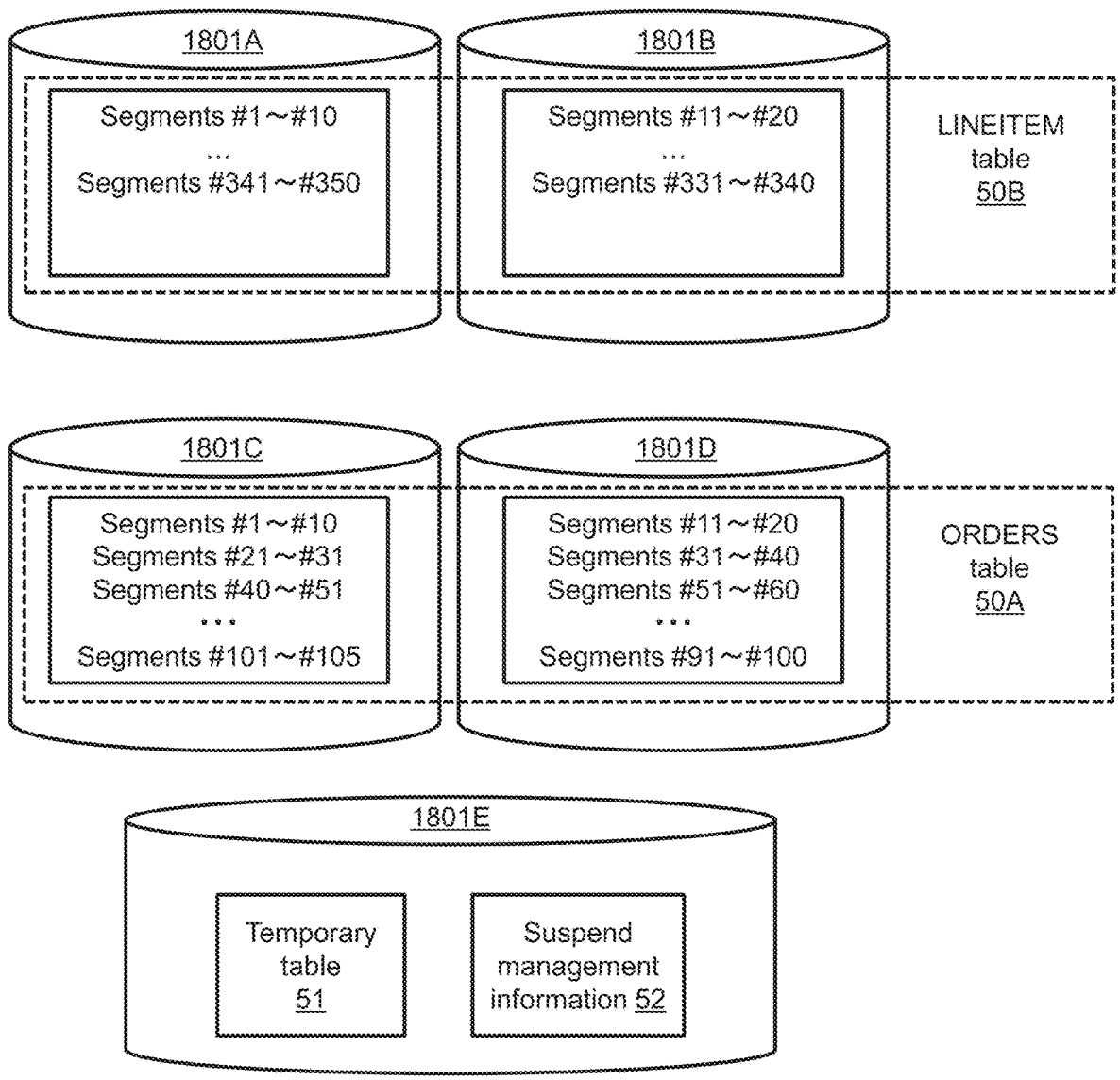
FIG. 17 illustrates an example of transaction management information according to Embodiment 2.
FIG. 18 illustrates an example of data arrangement according to Embodiment 2.

FIG. 17 illustrates an example of transaction management information according to Embodiment 2.

Transaction management information 1700 according to Embodiment 2 saves a power consumption upper limit 1701 which is information indicating a power consumption upper limit in addition to information 801 to 804 illustrated in FIG. 8. When the power consumption upper limit is designated in the received suspend instruction, the power consumption upper limit is configured in the transaction management information 1700 as the power consumption upper limit 1701.

FIG. 18 illustrates an example of data arrangement according to Embodiment 2.

The storage system 110 according to Embodiment 2 provides volumes 1801A to 1801E (an example of a plurality of volumes 1801). With regard to each of the volumes 1801A to 1801E, one or more permanent storage devices which the volumes 1801 are based on do not form the basis of volumes other than the volumes 1801. With regard to each of the volumes 1801, the one or more permanent storage devices which the volumes are based on each have, as power consumption-related states, an active state (I/O-capable state) and a power savings state (a state where power consumption is low in comparison with the active state). As the power savings states, power savings states of a plurality of types may be prepared.

The volumes 1801A to 1801E may also have an active state and a power savings state as power consumption-related states. When the state of the volumes 1801 is the active state, the state of each permanent storage device which the volumes 1801 are based on is also the active state. When the state of the volumes 1801 is the power savings state, the state of each permanent storage device which the volumes 1801 are based on is also the power savings state.

According to the example of FIG. 18, a portion of the LINEITEM table 50B is disposed in volume 1801A, and the remainder of LINEITEM table 50B is disposed in volume 1801B. A portion of the ORDERS table 50A is disposed in volume 1801C, and the remainder of ORDERS table 50A is disposed in volume 1801D. The temporary table 51 and suspend management information 52 are disposed in volume 1801E.

FIG. 19 illustrates an example of object list information according to Embodiment 2.

Each entry in object list information 1900 according to Embodiment 2 also holds information such as a power cost 1901 and a volume ID 1902 in addition to the information 702 to 705. One processing object is taken as an example hereinbelow ("object of interest" in the description of FIG. 19).

The power cost 1901 is an example of power consumption relating to an object of interest and indicates the maximum power consumption expected when power is consumed in executing the object of interest. The power cost 1901 may be calculated in the generation of an execution plan, for example. In addition, the power cost 1901 may be based on power consumption pertaining to the database operator to which the object of interest belongs, for example. Note that, for each database operator, the power consumption is based on the following, for example. One database operator is taken as an example hereinbelow (cared "target database operator" hereinbelow). At least one of the power consumption of one or more permanent storage devices which are accessed in the execution of the target database operator, the power consumption of the computing resource relating to execution of the target database operator, and the power consumption of one or more apparatuses having the one or more permanent storage devices. For example, the power consumption of the target database operator may be the sum total of a plurality of power consumptions corresponding to each of a plurality of devices (one or more devices among the storage system 110, permanent storage devices, network 160, and DB server 100, for example) relating to the target database operator.

The volume ID 1902 indicates the ID of each of the one or more volumes which are accessed through execution of the object of interest.

FIG. 20 illustrates an example of state management information according to Embodiment 2.

In state management information 2000 according to Embodiment 2, "suspend (Wait)" exists in addition to "suspend (SS)" and "suspend (DP)" as the processing object states 903. In Embodiment 1, processing objects can be executed in four parallel threads, and in this embodiment example, when the power consumption exceeds the power consumption upper limit 1701 corresponding to the transaction processing to which the object belongs upon executing processing objects in four parallel threads, the state 903 of a portion of the processing objects is set to "suspend (Wait)."

In this embodiment example, when a power consumption upper limit has been designated and when, between receipt of a suspend instruction and the suspend completion time, there are one or a plurality of snapshot suspend object target objects whose predicted completion time is at or precedes the suspend completion time (processing objects whose state 903 is "executable" or "suspend (SS)"), the query execution unit 133 determines, from the one or plurality of target objects, one or more target objects which are changed to a state signifying a snapshot suspend, on the basis of the power cost 1901 pertaining to each of the one or plurality of target objects. Accordingly, the power consumption can be maintained at or below the power consumption upper limit 1701 at any point in time between receipt of the suspend instruction until the suspend completion time.

In addition, in this embodiment example, if there are two or more target objects relating to the same computing resource among a plurality of target objects, the query execution unit 133 determines all of the two or more target objects as target objects which are changed to a state signifying a snapshot suspend. Accordingly, in a query processing suspend, it is possible to execute as many processing objects as possible at or before the suspend completion time in a range equal to or smaller than the power consumption upper limit 1701.

An example of the details of the processing executed in this embodiment example is as described below, for example. Note that, in the following description, the snapshot suspend object is an example of a target object.

(A) When there are a plurality of snapshot suspend objects that can be executed in parallel, if the respective access destinations of the plurality of snapshot suspend objects are a plurality of different volumes 1801, the query execution unit 133 makes the power consumption the sum of a plurality of power costs 1901 corresponding to each of the plurality of snapshot suspend objects. If the power consumption is equal to or smaller than the power consumption upper limit 1701, the query execution unit 133 executes the plurality of snapshot suspend objects in parallel. The query execution unit 133 may prioritize the execution of two or more snapshot suspend objects for which the access destination volume (an example of a computing resource) is the same over two or more snapshot suspend objects for which the access destination volume is different.

(B) Even when the sum of the plurality of power costs 1901 corresponding to each of the plurality of snapshot suspend objects that can be executed in parallel exceeds the power consumption upper limit 1701, in a case where the access destination of two or more snapshot suspend objects among the plurality of snapshot suspend objects is the same volume 1801, the query execution unit 133 may set the power consumption of the two or more snapshot suspend objects as the maximum value of two or more power costs 1901 each corresponding to the two or more snapshot suspend objects, and calculate the power consumption on the basis of the maximum value and the power costs 1901 of the other snapshot suspend objects. If the calculated power consumption is equal to or smaller than the power consumption upper limit 1701, the query execution unit 133 executes the plurality of snapshot suspend objects in parallel.

(C) When there are a plurality of snapshot suspend objects that can be executed in parallel, if, in either (A) or (B), the power consumption exceeds the power consumption upper limit 1701, the query execution unit 133 changes the state 903 of a portion of the snapshot suspend objects to "suspend (Wait)." The wait time is added to the predicted completion time of the portion of snapshot suspend objects. If, as a result, a snapshot suspend object whose predicted completion time does not exceed the suspend completion time is not generated, the query execution unit 133 changes the state 903 of the object to "suspend (DP)." According to the example in FIGS. 18 and 19, a dump save is written to the volume 1801E. When a dump save is executed, the dump power, which is the maximum power consumption defined for the dump save, is added to the power consumption. The query execution unit 133 may maintain the power consumption at or below a power level obtained by subtracting the dump power from the power consumption upper limit 1701. This is because a dump save may occur at any moment in a query processing suspend.

One of the specific examples of (A) to (C) is as follows, according to FIGS. 17 to 20. That is, among snapshot suspend objects B-2 and B-4 whose access destination volume is the same and snapshot suspend objects B-1 and B-5 whose access destination volume is the same, the query execution unit 133 executes the snapshot suspend objects B-2 and B-4 in parallel and places the snapshot suspend objects B-1 and B-5 in a standby state (changes the state 903 to "suspend (Wait)." The reason why the snapshot suspend objects B-1 and B-5 are not executed is because the power consumption when the snapshot suspend objects B-2 and B-4 are executed in parallel is 250 W and the power consumption when the snapshot suspend objects B-1 and B-5 are executed in parallel is also 250 W and the power consumption when all these snapshot suspend objects are executed in parallel is a total of 500 W, exceeding the power consumption upper limit 1701 of "400 W." In addition, the reason why the state 903 of the snapshot suspend objects B-1 and B-5 is "suspend (Wait)" and not "suspend(DP)" is that the predicted completion time of the snapshot suspend objects B-2 and B-4 is 23:12, and even if the snapshot suspend objects B-1 and B-5 are executed thereafter, there is the expectation that same will be completed at or before the suspend completion time "24:00." Note that, if the expectation is that the snapshot suspend objects B-1 and B-5 will not be completed at or before the suspend completion time, the query execution unit 133 changes the state 903 of the snapshot suspend objects B-1 and B-5 to "suspend (DP)."

The foregoing is a description of Embodiment 2. Note that in estimating the power consumption in the generation of an execution plan and determining a processing object which is to be an execution target, the technology disclosed in Japanese Unexamined Patent Application Publication No. 2017-045381 (or US2018/0329477), for example, can be used.

Embodiment 3

Embodiment 3 will be described hereinbelow. In so doing, points of difference from Examples 1 and 2 will mainly be described, while a description of points in common with Examples 1 and 2 will be omitted or simplified.

In Embodiment 2, a power consumption upper limit can be designated in a suspend instruction. When a power consumption upper limit is designated in a received suspend instruction, the power consumed in a query processing suspend is maintained at or below the power consumption upper limit. More specifically, for example, in the execution plan, an execution plan part, which is configured from one or more database operators and an execution order thereof and up to and including the database operators that are executed at or before the suspend completion time, is changed to a configuration with a lower power consumption.

Figure 21:
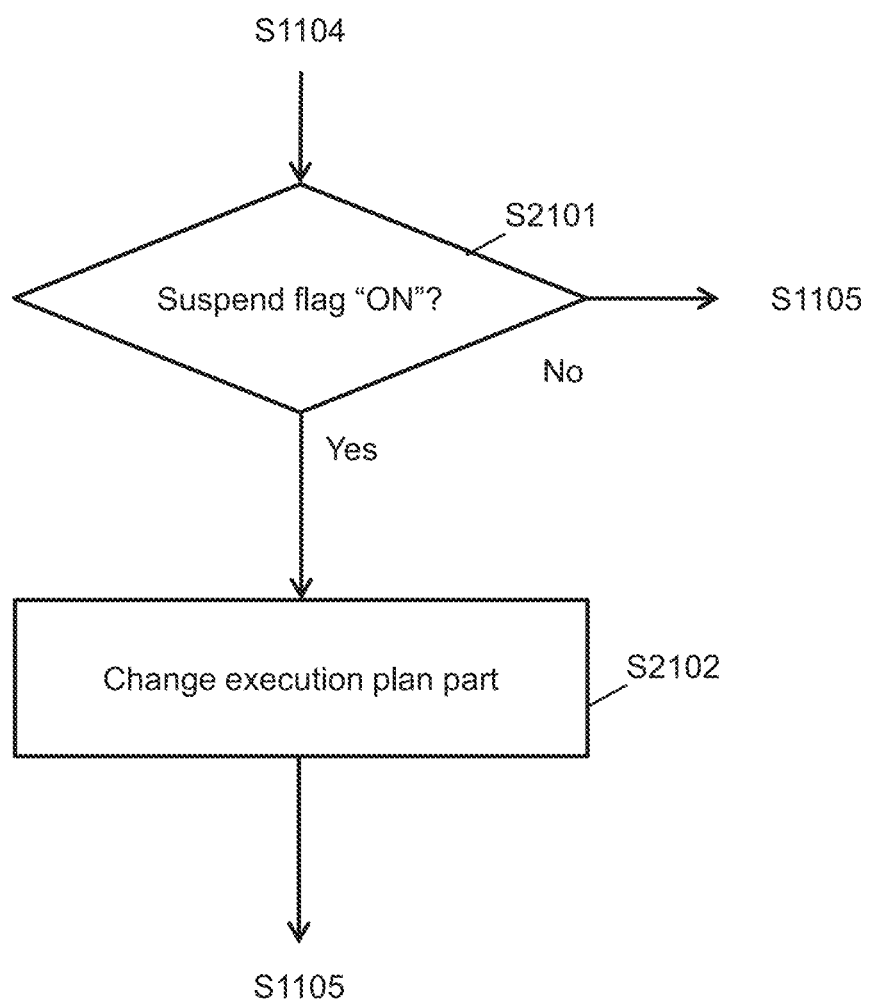
FIG. 21 illustrates part of query processing according to an Embodiment 3.

FIG. 21 illustrates a portion of query processing according to Embodiment 3. FIG. 22 illustrates an example of state management information according to Embodiment 3.

After S1104 in FIG. 11, the query execution unit 133 determines whether or not the suspend flag 803 corresponding to the transaction processing currently being executed (the transaction processing to which the block currently being executed belongs, for example) is "ON" (S2101). When the determination result of S2101 is false (S2101: No), the processing proceeds to S1105 (note that because the suspend flag 803 is "OFF," S1105 is skipped as a result and the processing moves to S1106).

When the determination result of S2101 is true (S2101: Yes), between receipt of a suspend instruction and the suspend completion time, the plan generation unit 132 changes the execution plan part up to and including the database operators that are executed at or before the suspend completion time on the basis of each of the power costs 1901 of one or a plurality of processing objects whose state 903 is "executable" or "unexecutable" (according to state management information 2200 illustrated in FIG. 22, each of the processing objects that belong to either of blocks B and C) (S2102). More specifically, for example, the plan generation unit 132 searches for an execution plan again, within a range of blocks to which processing objects whose state 903 is "executable" or "suspend (SS)" belong and to which processing objects whose state 903 is "unexecutable" do not belong, and if an execution plan (partial execution plan) indicating an access path with a smaller power consumption than the access path indicated by the current execution plan is found, the plan generation unit 132 changes the execution plan to the newly found execution plan.

The foregoing is a description of Embodiment 3. Note that in the search for an execution plan (access path), the technology disclosed in Japanese Unexamined Patent Application Publication No. 2018-169644 (or US2018/0285421), for example, can be used.

Several embodiment examples were explained hereinabove but are merely illustrations to explain the present invention, there being no intention to limit the scope of the present invention to these embodiment examples alone. The present invention can also be embodied in a variety of other modes.

What is claimed is:

1. A database management system, comprising:
a memory storing at least one program;
a processor which when executing the at least one program configures the processor to:
receive a query;
execute query processing, the query processing being configured by a plurality of processing objects for completing execution of the received query, with respect to a database; and
receive a suspend instruction in which a suspend completion time of the query processing is a future time, wherein,
when the suspend instruction has been received while execution of the query processing is in progress and between receipt of the suspend instruction and the suspend completion time:
if there is a target object being a processing object, among the plurality of processing objects configuring the query processing, whose state signifies execution in progress upon receipt of the suspend instruction and whose predicted completion time is at or precedes the suspend completion time, the processor is further configured to change the state of the target object to a state signifying a snapshot suspend,
if, after receiving the suspend instruction, there is a snapshot suspend object which is a processing object whose state signifies a snapshot suspend, and if there is unprocessed data in the snapshot suspend object, the processor is further configured to execute the snapshot suspend object at or before the suspend completion time,
if there is another target object, being another processing object, among the plurality of processing objects configuring the query processing, whose predicted completion time is after the suspend completion time, the processor is further configured to change the state of the another target object to a state signifying a dump suspend, and
if there is a dump suspend object, which is a processing object whose state signifies a dump suspend, the processor is further configured to execute a dump save which saves a dump containing mid-execution information of the dump suspend object.

2. The database management system according to claim 1, wherein,
if there is a snapshot suspend object whose predicted completion time precedes the current time, the processor is further configured to change changes the state of the snapshot suspend object to a state signifying a dump suspend.

3. The database management system according to claim 1, wherein the processor is further configured to:
if there is a snapshot suspend object whose predicted completion time is after the current time, the processor is further configured to:
correct the predicted completion time on the basis of progress of the snapshot suspend object, and
change the state of the snapshot suspend object to a state signifying a dump suspend, if the corrected predicted completion time precedes the current time.

4. The database management system according to claim 1, wherein a processing object whose state signifies executable is also categorized as the target object.

5. The database management system according to claim 4, wherein,
between receipt of the suspend instruction and the suspend completion time, if the predicted completion time of a processing object whose state has changed to executable is at or precedes the suspend completion time, the processor is further configured to change the state of the processing object to a state signifying a snapshot suspend.

6. The database management system according to claim 1, wherein the processor is further configured to:
generate, on the basis of the received query, an execution plan which is a plan for executing the query processing and which is information including one or a plurality of database operators and execution order relationships of database operators, wherein
the predicted completion time of each processing object is a completion time that is predicted on the basis of a database operator to which the processing object belongs and data which is accessed through execution of the processing object.

7. The database management system according to claim 6, wherein
the execution plan is divided into one or more blocks,
each of the one or more blocks is in a simultaneously executable processing range and is configured from one or more database operators, and
for each of the one or more blocks, there are one or more processing objects that constitute the block.

8. The database management system according to claim 1, wherein,
when a power consumption upper limit has been designated and when, between receipt of the suspend instruction and the suspend completion time, there are one or a plurality of target objects whose predicted completion time is at or precedes the suspend completion time, the processor is further configured to determine, from the one or plurality of target objects, one or more target objects which are changed to a state signifying a snapshot suspend, on the basis of power consumption pertaining to each of the one or plurality of target objects.

9. The database management system according to claim 8, wherein,
if there are two or more target objects relating to the same computing resource among the plurality of target objects, the processor is further configured to determine all of the two or more target objects as target objects which are changed to a state signifying a snapshot suspend.

10. The database management system according to claim 1, wherein the processor is further configured to:
generate, on the basis of the received query, an execution plan which is a plan for executing the query processing and which is information including one or a plurality of database operators and execution order relationships of database operators, wherein,
when a power consumption upper limit has been designated and the suspend instruction has been received, between receipt of the suspend instruction and the suspend completion time, the processor is further configured to change an execution plan part, which is configured from one or more database operators and an execution order thereof and up to and including database operators that are executed at or before the suspend completion time, on the basis of power consumption pertaining to each of the one or plurality of processing objects whose state is executable or snapshot suspend.

11. A database management method comprising the steps of:
upon receiving a suspend instruction, in which a suspend completion time of query processing is a future time, during execution of the query processing according to a query to a database, the query processing being configured by a plurality of processing objects for completing execution of the query, and between receipt of the suspend instruction and the suspend completion time:
upon determining that there is a target object being a processing object, among the plurality of processing objects configuring the query processing, whose state signifies execution in progress upon receipt of the suspend instruction and whose predicted completion time is at or precedes the suspend completion time, changing the state of the target object to a state signifying a snapshot suspend,
upon determining that, after receiving the suspend instruction, there is a snapshot suspend object which is a processing object whose state signifies a snapshot suspend, and if there is unprocessed data in the snapshot suspend object, executing the snapshot suspend object at or before the suspend completion time,
upon determining that there is another target object, being another processing object, among the plurality of processing objects configuring the query processing, whose predicted completion time is after the suspend completion time, changing the state of the another target object to a state signifying a dump suspend, and
upon determining that there is a dump suspend object, which is a processing object whose state signifies a dump suspend, executing a dump save which saves a dump containing mid-execution information of the dump suspend object.

* * * * *